(12) United States Patent
Sugitani et al.

(10) Patent No.: US 12,103,383 B2
(45) Date of Patent: Oct. 1, 2024

(54) VEHICULAR DRIVE DEVICE, AND ELECTRIC VEHICLE

(71) Applicant: IMADEST CORPORATION, Susono (JP)

(72) Inventors: Nobuyoshi Sugitani, Susono (JP); Aizoh Kubo, Kyoto (JP)

(73) Assignee: IMADEST CORPORATION, Susono (JP)

(*) Notice: Subject to any disclaimer, the term of this patent is extended or adjusted under 35 U.S.C. 154(b) by 553 days.

(21) Appl. No.: 17/617,407

(22) PCT Filed: Sep. 9, 2019

(86) PCT No.: PCT/JP2019/035422
§ 371 (c)(1),
(2) Date: Dec. 8, 2021

(87) PCT Pub. No.: WO2020/250453
PCT Pub. Date: Dec. 17, 2020

(65) Prior Publication Data
US 2022/0242229 A1 Aug. 4, 2022

(30) Foreign Application Priority Data

Jun. 10, 2019 (JP) .................................. 2019-107702

(51) Int. Cl.
*B60K 17/16* (2006.01)
*B60K 1/00* (2006.01)
(Continued)

(52) U.S. Cl.
CPC ................ *B60K 17/08* (2013.01); *B60K 1/00* (2013.01); *F16H 48/36* (2013.01)

(58) Field of Classification Search
CPC ...... B60K 17/08; B60K 17/20; B60K 17/165; B60K 2001/001; B60K 1/00; F16H 3/091; F16H 3/093; F16H 48/36
See application file for complete search history.

(56) References Cited

U.S. PATENT DOCUMENTS

2001/0008859 A1* 7/2001 Masaki .................... B62M 6/55
                                                      475/221
2007/0213162 A1    9/2007 Takasaki
(Continued)

FOREIGN PATENT DOCUMENTS

JP    2007-276760 A    10/2007
JP    2010-190287 A    9/2010
(Continued)

OTHER PUBLICATIONS

PCT/ISA/210, "International Search Report for International Application No. PCT/JP2019/035422," Nov. 19, 2019.

*Primary Examiner* — Tinh Dang
(74) *Attorney, Agent, or Firm* — HAUPTMAN HAM, LLP

(57) ABSTRACT

In a drive device, it is possible to reduce the size of a planetary gear mechanism, reduce the size and weight of the entire drive device, reduce the dimension between the tip ends of an output shaft for outputting rotational torque, the tip ends protruding in directions opposite to each other, and improve vehicle stability. External sun gears are coupled to an input shaft. Planetary carriers are coaxial with the input shaft, are adjacent to planetary gears in the axial direction thereof, and have external gears that rotate together with the planetary carriers. Ring gears respectively meshing with the planetary carriers are rotatably supported and rotate in mutually opposite directions by means of a differential mechanism. Intermediate gears and input-side gears are respectively fixed to intermediate shafts, the intermediate
(Continued)

gears respectively meshing with the external gears. Output gears respectively meshing with the input-side gears are respectively fixed to output shafts.

11 Claims, 17 Drawing Sheets

(51) Int. Cl.
*B60K 17/08* (2006.01)
*F16H 48/36* (2012.01)

(56) References Cited

U.S. PATENT DOCUMENTS

2017/0313182 A1* 11/2017 Isono .................. F16H 1/28
2018/0339695 A1* 11/2018 Kawahara ............ B60K 17/165

FOREIGN PATENT DOCUMENTS

| JP | 2017-145914 A | 8/2017 | | |
|---|---|---|---|---|
| WO | 2015/008661 A1 | 1/2015 | | |
| WO | WO-2019051314 A1 * | 3/2019 | ........... | B60K 17/046 |

* cited by examiner (a)

(b)

(a)

(b)

(c)

(a)

(b)

(c)

(a)

(b)

(a)

(b)

VEHICULAR DRIVE DEVICE, AND ELECTRIC VEHICLE

RELATED APPLICATIONS

The present application is National Phase of International Application No. PCT/JP2019/035422 filed Sep. 9, 2019, and claim priority from Japanese Application No. 2019-107702, filed Jun. 10, 2019, the disclosures of which are hereby incorporated by reference herein in its entirety.

TECHNICAL FIELD

The present invention relates to a vehicular drive device and an electric vehicle, and more particular, it relates to a vehicular derive device that transmits rotational motion or power (rotational torque) dividedly through two paths, and an electric vehicle equipped with the drive device.

BACKGROUND ART

A diff mechanism is used for absorbing a difference in track between inside/outside right and left wheels caused when a vehicle turns. The diff mechanism was invented more than 150 years ago, but has not substantially been changed mechanically.

FIG. 13 (*a*) and 13 (*b*) are explanatory diagrams conceptually illustrating the structure of a general diff mechanism 90 of Conventional Example 1. As illustrated in FIG. 13 (*a*) and 13 (*b*), a pair of differential gears 92 and 94 opposing to each other mesh with a plurality of (merely one of which is illustrated in FIG. 13 (*a*) and 13 (*b*)) differential pinions 96. The differential gears 92 and 94 are respectively coupled to output shafts 93 and 95. Besides, a ring gear 98 and a frame member 99 fixed to the ring gear 98 are disposed in such a manner as to rotate without interfering the differential gears 92 and 94 and the output shafts 93 and 95. Each differential pinion 96 is rotatably supported by a pin 97 attached to the frame member 99.

Rotational motion or power (rotational torque) is transmitted from the ring gear 98 to a wheel through the differential pinion 96, the differential gears 92 and 94 and the output shafts 93 and 95. For example, when the ring gear 98 is rotated in a state where the differential gear 92 and the output shaft 93 disposed on one side do not rotate as illustrated in FIG. 13(*a*), the differential pinion 96 moves while rotating around the pin 97, and the differential gear 94 and the output shaft 95 disposed on the other side rotate. When the ring gear 98 is rotated in a state where the differential pinion 96 does not rotate around the pin 97 as illustrated in FIG. 13(*b*), the differential gears 92 and 94 and the output shafts 93 and 95 rotate in the same direction.

In recent years, vehicle electrification has progressed. For example, in a hybrid vehicle using an internal combustion engine (engine) and an electric motor (motor) as prime movers, the engine is principally used as a power source, energy consumed in deceleration by a regenerative break using the motor as an electric generator is stored in a battery, and the energy stored in the battery is used for driving the motor at the start, and thus, a highly efficient system is constructed. Besides, an electric vehicle using a motor alone as a power source has been spread at a higher speed. Accordingly, an electric unit using a motor as a drive source has become more and more significant, and an electric unit using a motor as a drive source and integrally including a diff mechanism has been proposed.

The hybrid system is classified into parallel type and series type. In the parallel type hybrid system, an electric unit including a diff mechanism is disposed in a rear portion to be used for four-wheel drive in many cases, and in the series type hybrid system, it is used as a drive unit for transmitting, directly to a wheel, electrical energy from an electric generator and a battery in the same manner as in an electric vehicle.

For example, FIG. 14 is an explanatory diagram of a drive device 110*a* of Conventional Example 2-1 including a motor 106 disposed between coaxially disposed two planetary gear mechanisms 111*a* and 111*b*. As illustrated in FIG. 14, the two planetary gear mechanisms 111*a* and 111*b* respectively include external sun gears 112*a* and 112*b*, a plurality of planetary gears 114*a* and 114*b* that respectively mesh with the external sun gears 112*a* and 112*b*, ring gears 116 and 117 having internal teeth that mesh with the planetary gears 114*a* and 114*b*, and planetary carriers 115*a* and 115*b* that rotatably support the plurality of planetary gears 114*a* and 114*b*. A rotation shaft 108 of the motor 106 protrudes to both sides to be coupled to the external sun gears 112*a* and 112*b* of the planetary gear mechanisms 111*a* and 111*b*. An intermediate gear 113 is fixed to the rotation shaft 108 to mesh with a drive input gear 130, and the drive input gear 130 meshes with a drive transmission gear 131. Rotation of an engine not shown is transmitted to the drive transmission gear 131.

The ring gears 116 and 117 respectively have externally toothed gears formed on outer circumferential surfaces thereof, and are connected to each other through at least one pair of first and second auxiliary gear members 118 and 119 so as to rotate in mutually opposite directions. The first and second auxiliary gear members 118 and 119 respectively have gears 118*a* and 118*b*; and 119*a* and 119*b* fixed to both ends of respective shafts, and the gears 18*a* and 19*a* disposed on one side mesh with the externally toothed gears of the ring gears 116 and 117, and the gears 118*b* and 119*b* disposed on the other side mesh with each other to rotate in mutually opposite directions. Rotational torque is transmitted from central shafts 115*s* and 115*t* respectively coupled to the planetary carriers 115*a* and 115*b* to wheels 102*a* and 102*b* through a constant velocity joint and a drive shaft.

Besides, a control gear 105 fixed to a rotation shaft 104*a* of a control motor 104 meshes with the externally toothed gears of the ring gear 117 on one side (see, for example, FIG. 7 or the like of Patent Literature 1).

FIG. 15, FIG. 16 (*a*), 16 (*b*) and 16 (*c*) are explanatory diagrams of a drive device 110 of Conventional Example 2-2 including a motor (not shown) disposed away from coaxially disposed two planetary gear mechanisms 111*la* and 111*b*. This drive device 110 has substantially the same structure as the drive device 110*a* of FIG. 13 (*a*) and 13 (*b*) as illustrated in FIG. 15, FIG. 16 (*a*), 16 (*b*) and 16 (*c*), but differently from the drive device 110*a* of FIG. 13 (*a*) and 13 (*b*), external sun gears 112*a* and 112*b* of the two planetary gear mechanisms 111*a* and 111*b* are coupled to a coupling shaft 112. An intermediate gear 113 is fixed to the coupling shaft 112, the intermediate gear 113 meshes with a drive input gear 130, and the drive input gear 130 meshes with a drive transmission gear 131 (not shown in FIG. 15, FIG. 16 (*a*), 16 (*b*) and 16 (*c*)) to which rotation of the motor or an engine not shown are transmitted (see FIG. 1, FIG. 2 or the like of Patent Literature 1).

These drive devices 110*a* and 110 are capable of controlling distribution of rotational torque and a difference in rotational speed between the right and left central shafts 115*s* and 115*t*. Specifically, when a difference is caused in rotational torque between the two planetary gear mechanisms 111a and 111b, the two ring gears 116 and 117 rotate in mutually opposite directions. Besides, when a difference is caused in rotational speed between the two central shafts 115s and 115t, the two ring gears 116 and 117 rotate in the mutually opposite directions. The control motor 104 is appropriately rotated, and thus, the difference in rotational speed between the two central shafts 115s and 115t can be controlled, or the difference in rotational torque transmitted to the two central shafts 115s and 115t can be controlled (see, for example, Patent Literature 1).

FIG. 17 is a cross sectional view of a drive device 201 of Conventional Example 3 including coaxially disposed two planetary gear mechanisms 207 and 208, and two output shafts disposed at a distance in a direction perpendicular to an axial direction. As illustrated in FIG. 17, external sun gears 209 and 214 of the planetary gear mechanisms 207 and 208 are coupled to an output shaft 203 of a motor 202. Externally toothed gears 213 and 218 are formed to be adjacent to each other respectively on planetary carriers 211 and 216 of the planetary gear mechanisms 207 and 208. Output gears 228 and 235 of output gear members 226 and 233 respectively mesh with the externally toothed gears 213 and 218. The output gear members 226 and 233 respectively have shaft parts 227 and 234 corresponding to the output shafts of the drive device 201, and input shafts 231 and 238 of connection mechanisms 230 and 237 such as a constant velocity joint are respectively spline connected to hollow portions of the shaft parts 227 and 234.

Ring gears 210 and 215 of the planetary gear mechanisms 207 and 208 have externally toothed gears respectively formed on outer circumferential surfaces thereof, and are connected each other through a differential mechanism 219 similar to that shown in FIGS. 13 (a) and FIG. 13 (b) or FIG. 15. Specifically, two gears 222 and 223; and 224 and 225 are respectively formed on first and second shafts 220 and 221. The gears 222 and 224 disposed on one side mesh with the external toothed gears of the ring gears 210 and 215, the gears 223 and 225 disposed on the other side mesh with each other, and the first and second shafts 220 and 221 rotate in mutually opposite directions (see, for example, Patent Literature 2).

CITATION LIST

Patent Literature

[Patent Literature 1] International Publication No. 2015/008661 (Japanese Patent No. 6122119)
[Patent Literature 2] Japanese Patent Laid-Open No. 2017-145914 (Japanese Patent No. 6348526)

SUMMARY OF INVENTION

Technical Problem

The general diff mechanism of Conventional Example 1 has the following problems:

First, the mesh between the differential gears 92 and 94 and the differential pinions 96 is poor in efficiency. Therefore, when a difference in rotational speed is caused between right and left wheels, energy is lost, and vehicle driving efficiency, namely, fuel efficiency, is deteriorated. This is one of principal causes why actual fuel consumption is worse than fuel consumption in driving straight ahead.

Secondly, when a driving force is to be actively distributed, it is necessary to control the rotation of the differential pinions, which is mechanically difficult to realize.

Thirdly, since the right and left output shafts 93 and 95 are coupled to each other through the differential gears 92 and 94 and the differential pinions 96, it is necessary to provide backlash in a thrust direction, but this backlash harmfully affects vehicle stability.

Driving force distribution enabled in Conventional Example 2-1 and Conventional Example 2-2 is extremely effective control means for a vehicle. In particular, in an electric unit, a motor used as a drive source has a higher rotational speed as compared with an internal combustion engine such as a conventional engine, and hence during transmission to a tire, has a large deceleration ratio, and hence, a moment of inertia (inertia) of the motor is large. Conversely, a moment of inertia of a tire or the like taken from the motor is small, and hence the vehicle is unstable against disturbance such as roughness and a friction coefficient of a road surface. Torque vectoring by drive force distribution has become indispensable to an electric unit for improving vehicle stability and ensuring safety.

Besides, also in normal driving such as turning, torque vectoring by drive force distribution is largely effective.

In steering a vehicle, an angle difference designated as a slip angle is caused between a tire running direction and a vehicle turning direction, and hence the tire generates a lateral force so as to cause the vehicle to turn around the center of gravity thereof, resulting in causing a difference in track between inside/outside wheels in the vehicle. Accordingly, a considerable delay is caused between steering and turning of the vehicle. Besides, large drive force and breaking force can be generated in the tire rotation direction, but a large force cannot be linearly generated as a lateral force vertical to the rotation direction. Furthermore, the slip angle is not constant but largely varied not only depending on a steering angle but also a vehicle speed, a load applied to tires and the like.

On the other hand, a vehicle can be turned not only by a lateral force of a tire caused by steering but also by controlling drive forces of right and left wheels to cause a rotation difference. In this case, since a rotation difference is directly caused, vehicle response is fast, a slip angle is small, and generation of a lateral force is suppressed to exhibit stable behavior, and thus, the vehicle can stably drive. In other words, when torque vectoring for distributing a drive force in steering is performed for ensuring vehicle stability, high response is obtained, saturation of friction of a tire otherwise caused by a lateral force is suppressed, and stable turning can be realized.

In the present invention, as for a torque vectoring mechanism thus indispensable in an electric unit, a rational decelerator is disposed using a highly rigid gear mechanism to realize a diff mechanism suitable for a compact and light electric unit, and a control motor is disposed to realize what is called a torque vectoring mechanism capable of drive force distribution, and thus, the present invention aims to contribute to vehicle electrification. Besides, the present invention aims to provide an electric unit, with which in driving on bad roads having "matagi" (variation in the road surface friction coefficient) or surface roughness, in high speed driving or the like, vehicle stability is increased by controlling a drive force of the vehicle, and in addition, in low speed driving, a minimum turning radius or the like is reduced to increase convenience of the vehicle, and which is suitable for vehicle control meeting recent social needs such as self-driving and collision avoidance.

The drive devices 110a and 110 of Conventional Example 2-1 and Conventional Example 2-2 principally have the following three problems.

First, the drive devices 110a and 110 cannot be reduced in size as the entire device. This is because the planetary gear mechanisms 111a and 111b and the control motor 104 cannot be reduced in size.

As described above, the planetary carriers 115a and 115b of the two planetary gear mechanisms are respectively coupled to the central shafts 115s and 115t corresponding to axle shafts. The central shafts 115s and 115t are respectively connected to the drive shaft through the constant velocity joints. Thus, rotational motion and rotational torque are transmitted from the central shafts 115s and 115t of the drive device 110 to the wheels 102a and 102b. In this structure, the planetary carriers 115a and 115b and the central shafts 115s and 115t have the same rotational motion and rotational torque as the wheels 102a and 102b.

Therefore, even when a drive motor is disposed away from the planetary gear mechanisms 111a and 111b as in Conventional Example 2-2, the planetary gear mechanisms 111a and 111b should have gear strength sufficient for withstanding high torque transmitted to the wheels 102a and 102b. Accordingly, there is no choice but to increase the module of gears included in the planetary gear mechanisms 111a and 111b, and hence the planetary gear mechanisms 111a and 111b cannot be reduced in size. Besides, also the control motor 104 that adds differential torque to the torque to be transmitted to the wheels 102a and 102b cannot be reduced in size. As a result, the entire drive device cannot be reduced in size.

Secondly, it is difficult to increase the length of the drive shaft. In order to input rotational torque to the planetary gear mechanisms 111a and 111b, it is necessary to dispose, between the planetary gear mechanisms 111a and 111b, the intermediate gear 113 for transmitting a drive force and a drive source such as the motor 106. Therefore, a distance between the planetary gear mechanisms 111a and 111b is increased.

Besides, if the planetary carriers 115a and 115b are rotatably supported merely on the sides of the central shafts 115s and 115t, these are in a cantilever state, and hence gears and bearings can be easily damaged. When the planetary carriers 115a and 115b are rotatably supported on both sides thereof, namely, on the sides of the central shafts 115s and 115t and on the opposite sides by bearings, the distance between the planetary gear mechanisms 111a and 111b is increased.

Since the central shafts 115s and 115t are disposed on the both sides of the planetary gear mechanisms 111a and 111b, when the distance between the planetary gear mechanisms 111a and 111b is increased, it is difficult to reduce a dimension between tip ends, protruding in opposite directions, of the central shafts 115s and 115t, which are the two output shafts for outputting the rotational torque. As a result, the width of a drive system is increased, and hence it is difficult to configure a vehicle suspension system that makes vehicle driving more stable.

Specifically, when the drive shafts coupling the central shafts 115s and 115t to the wheels 102a and 102b are short, a change of the camber angle of the wheels 102a and 102b against the bounding and rebounding motion of the wheels becomes large, which makes the vehicle driving unstable on a road having large surface roughness. When the drive shafts are long, the driving is stabilized. In order to elongate the drive shafts, the dimension between the tip ends of the central shafts 115s and 115t protruding in the opposite directions may be reduced. It is, however, difficult to reduce the dimension between the tip ends of the central shafts 115s and 115t protruding in the opposite directions as described above, and hence it is difficult to configure a vehicle suspension system that makes vehicle driving more stable.

Thirdly, it is difficult to further improve the vehicle stability by the drive device 110. A deceleration ratio between the central shafts 115s and 115t and the ring gears 116 and 117 of the first and second planetary gear mechanisms is very small, is necessarily 1 or more and 2 or less, and is usually smaller than 1.5. In other words, when carrier output and ring gear input are employed in a planetary gear mechanism, the deceleration ratio is calculated as the number of teeth of a sun gear/the number of a ring gear+1.

When a deceleration ratio is small, a moment of inertia is small. Therefore, when the ring gears 116 and 117 included in the diff and connected to rotate in mutually opposite directions are used, in occurrence of disturbance to the both tires such as a rough road surface, an inertial suppression effect is small, and stress change is caused at a rapid rise. The ring gears 116 and 117 mutually affect, and this change can be suppressed by only a very fast control system. In other words, when this mechanism is used, the vehicle drive force is instantly and rapidly changed in driving on bad roads having "matagi" or surface roughness, in high speed driving or the like, and therefore, means for further improving vehicle stability is demanded.

The drive device 201 of Conventional Example 3 has the following problems.

First, the drive device 201 of Conventional Example 3 is larger as a whole than the drive devices 110a and 110 of Conventional Example 2-1 and Conventional Example 2-2, and the entire mass of the drive device is so increased that it is not possible to reduce the size and the weight. Originally, the drive device 201 aims to elongate the drive shafts, and does not aim to reduce the size and the weight of the planetary gear mechanisms 207 and 208. In the drive device 201, it is necessary to ensure a center-to-center distance between the input shaft 231 and the motor 202 so as not to interfere with an attachment flange of the motor 202 and a bearing or the like, not shown, supporting the input shaft 231. Therefore, a sum of the outer diameter of the externally toothed gears 213 and 218 of the planetary carriers 211 and 216 and the outer diameter of the output gears 228 and 235 of the output gear members 226 and 233 depends on the center-to-center distance. Besides, the externally toothed gears 213 and 218 and the output gears 228 and 235 need to mesh with each other without interfering the differential mechanism 219 that rotates the ring gears 210 and 215 of the planetary gear mechanisms 207 and 208 in the opposite directions. Furthermore, when the outer diameter of the output gears 228 and 235 is increased, a minimum ground clearance is reduced, which increases a risk of damage by collision with a curbstone or the like. Therefore, the outer diameter of the externally toothed gears 213 and 218 and the outer diameter of the output gears 228 and 235 are restricted, and a deceleration ratio between the externally toothed gears 213 and 218 and the output gears 228 and 235 is 1.2 at most. Even when the planetary gear mechanisms 207 and 208 can be rather reduced in size by additionally providing deceleration, mass increase caused by the output gear members 226 and 233 and additional components such as bearings for these overwhelmingly surpasses the mass reduction of the planetary gear mechanisms 207 and 208. Accordingly, it is impossible to reduce the size and the weight of the drive device 201.

Secondly, the drive device 201 has a problem of durability. The output gear members 226 and 233 are respectively supported by bearings 229 and 236 on one side in the axial direction, and are in a cantilever state. Therefore, as compared with a case where the output gear members 226 and 233 are supported by bearings on both sides in the axial direction, the output gear members 226 and 233 are easily tilted, and there is a high risk of damage of the bearings 229 and 236, and gears of the externally toothed gears 213 and 218 and the output gears 228 and 235. In particular, when the externally toothed gears 213 and 218 and the output gears 228 and 235 are helical gears, the risk is increased as compared with a case where these are spur gears. Accordingly, the drive device 201 has a problem of durability.

In consideration of these actual circumstances, a first problem to be solved by the present invention is to provide a drive device with which it is possible to reduce the size of two planetary gear mechanisms, reduce the size and the weight of the entire drive device, reduce the dimension between the tip ends, protruding in mutually opposite directions, of two output shafts for outputting rotational torque, and further improve vehicle stability, and a second problem is to provide a drive device excellent in durability.

Solution to Problem

In order to solve the above-described problems, the present invention provides a drive device configured as follows.

The drive device is a drive device for distributing rotational torque to right and left wheels of a vehicle, including: (a) an input shaft rotatively driven by a drive source; (b) first and second intermediate shafts rotatably supported; (c) first and second output shafts rotatably supported; (d) first and second planetary gear mechanisms coupled to the input shaft in such a manner as to be adjacent to each other in an axial direction of the input shaft; (e) a differential mechanism for equally distributing the rotational torque to the first and second planetary gear mechanisms; (f-1) a first rotation transmission mechanism that transmits rotation from the first planetary gear mechanism to the first intermediate shaft; (f-2) a second rotation transmission mechanism that transmits rotation from the second planetary gear mechanism to the second intermediate shaft; (g-1) a first deceleration mechanism that transmits rotation from the first intermediate shaft to the first output shaft with the rotation decelerated; and (g-2) a second deceleration mechanism that transmits rotation from the second intermediate shaft to the second output shaft with the rotation decelerated. Each of the first and second planetary gear mechanisms includes: (i) an external sun gear fixed to the input shaft; (ii) a plurality of planetary gears that mesh with the external sun gear, and rotate around the external sun gear while revolving; (iii) a hollow cylindrical ring gear that is rotatably supported, and includes inner teeth meshing with the planetary gears; and (iv) a planetary carrier that rotatably supports the planetary gears. The planetary carrier includes an external gear corresponding to an externally toothed gear that is coaxial with the input shaft, is adjacent to the planetary gears in the axial direction, and rotates together with the planetary carrier. The differential mechanism connects the ring gear of the first planetary gear mechanism to the ring gear of the second planetary gear mechanism in such a manner that the ring gears rotate in mutually opposite directions. The first rotation transmission mechanism includes the external gear of the planetary carrier of the first planetary gear mechanism; and a first intermediate gear that is fixed to the first intermediate shaft and meshes with the external gear of the planetary carrier of the first planetary gear mechanism. The second rotation transmission mechanism includes the external gear of the planetary carrier of the second planetary gear mechanism; and a second intermediate gear that is fixed to the second intermediate shaft, and meshes with the external gear of the planetary carrier of the second planetary gear mechanism. The rotational torque input to the input shaft is distributed to the first planetary gear mechanism and the second planetary gear mechanism, is output from the first output shaft through the first planetary gear mechanism, the first rotation transmission mechanism and the first deceleration mechanism, and is output from the second output shaft through the second planetary gear mechanism, the second rotation transmission mechanism, and the second deceleration mechanism.

In the above-described structure, owing to the deceleration performed in the first and second deceleration mechanisms, a force applied to gears of the first and second planetary gear mechanisms is reduced, and hence the first and second planetary gear mechanisms can be reduced in size. Besides, since the first and second output shafts are disposed to be aligned with the first and second planetary gear mechanisms in a direction perpendicular to the axial direction, the dimension between tip ends of the first and second output shafts protruding in mutually opposite directions can be reduced than in a case where the output shafts are disposed on both sides of the first and second planetary gear mechanisms in the axial direction.

Besides, a deceleration ratio between the first and second output shafts having the same rotation as tires and the ring gears of the first and second planetary gear mechanisms is large. Since a moment of inertia is in proportion to a square of a deceleration ratio, a moment of inertia on the side of the drive device against the tires is larger than in a case where the first and second output shafts are coupled to the planetary carriers of the first and second planetary gear mechanisms, and thus variation in the rotational speed of the tires is suppressed. On a cobblestone road (Belgian road) or the like having large surface roughness, it is apprehended that road holding performance of tires may be deteriorated, and wheels on one side or both sides may highly rotate to make the vehicle unstable. Owing to the influence of this increase in a moment of inertia on the side of the drive device against the tires, however, the rotation rise of the tires is slowed, and hence vehicle stability can be further improved.

In the above-described structure, the external gear rotating together with the planetary carrier may be formed in a part of the planetary carrier, or may be attached to the planetary carrier. In the former case, the planetary carrier includes a portion functioning as the external gear. In the latter case, when the external gear rotates together with the planetary carrier, it is possible to employ a structure in which the external gear is fixed to the planetary carrier so as not to move the external gear relatively to the planetary carrier, or alternatively, it is possible to employ a structure in which the external gear and the planetary carrier can move relatively to each other, for example, the external gear and the planetary carrier are fit with each other to relatively move in the axial direction.

The first and second rotation transmission mechanisms may transmit the rotation of the planetary carriers to the first and second intermediate gears with the rotation decelerated, or accelerated, or without changing the rotation, but preferably with the rotation decelerated as described below.

The differential mechanism may be configured to mutually connect external teeth formed on the outer circumferential surfaces of the ring gears of the first and second planetary gear mechanisms, or to elongate internal teeth of the ring gears of the first and second planetary gear mechanisms and mutually connect the elongated portions of the internal teeth, or to mutually connect the ring gears of the first and second planetary gear mechanisms through a chain, a belt or the like.

The drive device preferably further includes, in one of or both of the ring gears of the first and second planetary gear mechanisms, (h) a rotation control mechanism that transmits rotational torque from a control motor.

In this case, what is called a torque vectoring function for distributing a driving force can be realized by controlling, with the control motor, differences in the rotation angle and the drive torque between the first and second output shafts.

As described above, the rotation rise of the tires is slowed owing to the influence of the increase in a moment of inertia on the side of the drive device against the tires. Besides, since the control motor is connected to the ring gear through deceleration, even a slight change in the rotation angle of the output shaft becomes a large change of the rotation angle in the control motor. Accordingly, control of a slight change of the rotational speed of the output shaft corresponds to rough control in a wide range of the change in the rotational speed of the control motor. For example, control to stop the relative rotation of the output shafts is to be performed, extremely good controllability can be obtained even when the control is performed at a lower speed than in conventional technique. Besides, this mechanism employs a gear configuration, and hence is less affected by friction, has good controllability, and can suppress hunting or resonance caused by the control.

In the drive device, preferably, the first and second output shafts are disposed coaxially with each other, and are relatively rotatably coupled to each other through a first bearing at first end sides thereof opposing each other.

In this case, a distance between second ends of the first and second output shaft can be further reduced. As a result, the drive device can be further reduced in size to configure a vehicle suspension system that makes vehicle driving more stable.

More preferably, the first and second deceleration mechanism respectively include first and second output gears respectively fixed to the first and second output shafts. The first and second output gears respectively include helical gears having helix angles mutually in opposite directions in such a manner as to cause the first and second output shafts to come close to each other in usual drive.

In this case, owing to a thrust force in the axial direction caused by the helical gears, backlash in the axial direction of the first and second output shafts against the first bearing can be suppressed, and in addition, the relative rotational speed can be suppressed.

Preferably, the first and second rotation transmission mechanisms are respectively configured to decelerate rotation of the planetary carriers of the first and second planetary gear mechanisms, and transmit decelerated rotation to the first and second intermediate shafts.

In this case, efficiency is better as compared with a case where deceleration is performed in the first and second deceleration mechanisms after performing acceleration once in the first and second rotation transmission mechanisms.

Preferably, the planetary carriers of the first and second planetary gear mechanisms are adjacent to each other in the axial direction, and are relatively rotatably coupled to each other through a second bearing.

In this case, a distance between the planetary carriers of the first and second planetary gear mechanisms can be reduced to reduce the drive device in size.

Preferably, the planetary carrier of the first planetary gear mechanism has the external gear on a side opposite to the second planetary gear mechanism, and the planetary carrier of the second planetary gear mechanism has the external gear on a side opposite to the first planetary gear mechanism.

In this case, the first and second deceleration mechanisms are disposed between the first and second planetary gear mechanisms in the axial direction, and the first and second output shafts are disposed to be close to each other, and thus, the entire drive device can be reduced in size.

Preferably, the ring gears of the first and second planetary gear mechanisms are coaxial with each other, are adjacent to each other in the axial direction, and are relatively rotatably coupled to each other through a third bearing.

In this case, a distance between the ring gears of the first and second planetary gear mechanisms can be reduced to reduce the drive device in size.

Preferably, the drive device further includes (i-1) a rotation member connected, to rotate, to a rotating member disposed between the input shaft and each of the first and second output gears; and (i-2) a brake device that stops rotation of the rotation member.

In this case, as compared with a usual disk brake provided adjacent to a wheel, a compact brake device can be incorporated in the drive device.

Preferably, the drive device further includes (j-1) a drive motor corresponding to the drive source; and (j-2) the control motor. The drive motor and the control motor are both disposed on an opposite side of the first planetary gear mechanism to the second planetary gear mechanism, or on an opposite side of the second planetary gear mechanism to the first planetary gear mechanism.

In this case, the drive motor and the control motor are disposed on the same side in the axial direction in the drive device, and the drive device has a space on the opposite side of the drive motor and the control motor, and hence the drive device can be easily mounted on a vehicle.

Preferably, a center of the control motor is disposed inside the drive motor in a perspective view in the axial direction.

In this case, protrusion derived from the control motor can be reduced or eliminated so that the device can be easily mounted on a vehicle, and in addition, a range extender corresponding to an electric generator can be easily disposed.

Advantageous Effects of Invention

According to the present invention, since a selectable range of a deceleration ratio between planetary carriers of first and second planetary gear mechanisms and first and second output shafts is increased owing to first and second rotation transmission mechanisms and first and second deceleration mechanisms, the two planetary gear mechanisms can be sufficiently reduced in size, and the size and the weight of the entire drive device can be reduced. Besides, mutually opposing base ends of the two output shafts for outputting rotational torque are disposed to be close to each other, and thus, a dimension between tip ends protruding in mutually opposite directions of the two output shafts can be reduced. Furthermore, a moment of inertia on a side of the drive device against a wheel is increased to suppress variation of the rotational speed of the wheel, and furthermore, the entire width of the drive device can be reduced, and therefore the degree of freedom in design of a suspension system is increased under restriction of a vehicle tread, so that vehicle stability can be further improved. In addition, the output shafts, planetary carriers, or ring gears are mutually coupled to be relatively rotatable by bearings, and hence support stiffness is improved as compared with that in a cantilever state, and therefore, there is a low risk of damage of bearings and gears, and thus excellent durability is obtained.

DESCRIPTION OF EMBODIMENT

Now, an embodiment of the present invention will be described with reference to the accompanying drawings.

<Example 1> A drive device 10 of Example 1 will now be described with reference to FIGS. 1 to 7.

Figure 1:
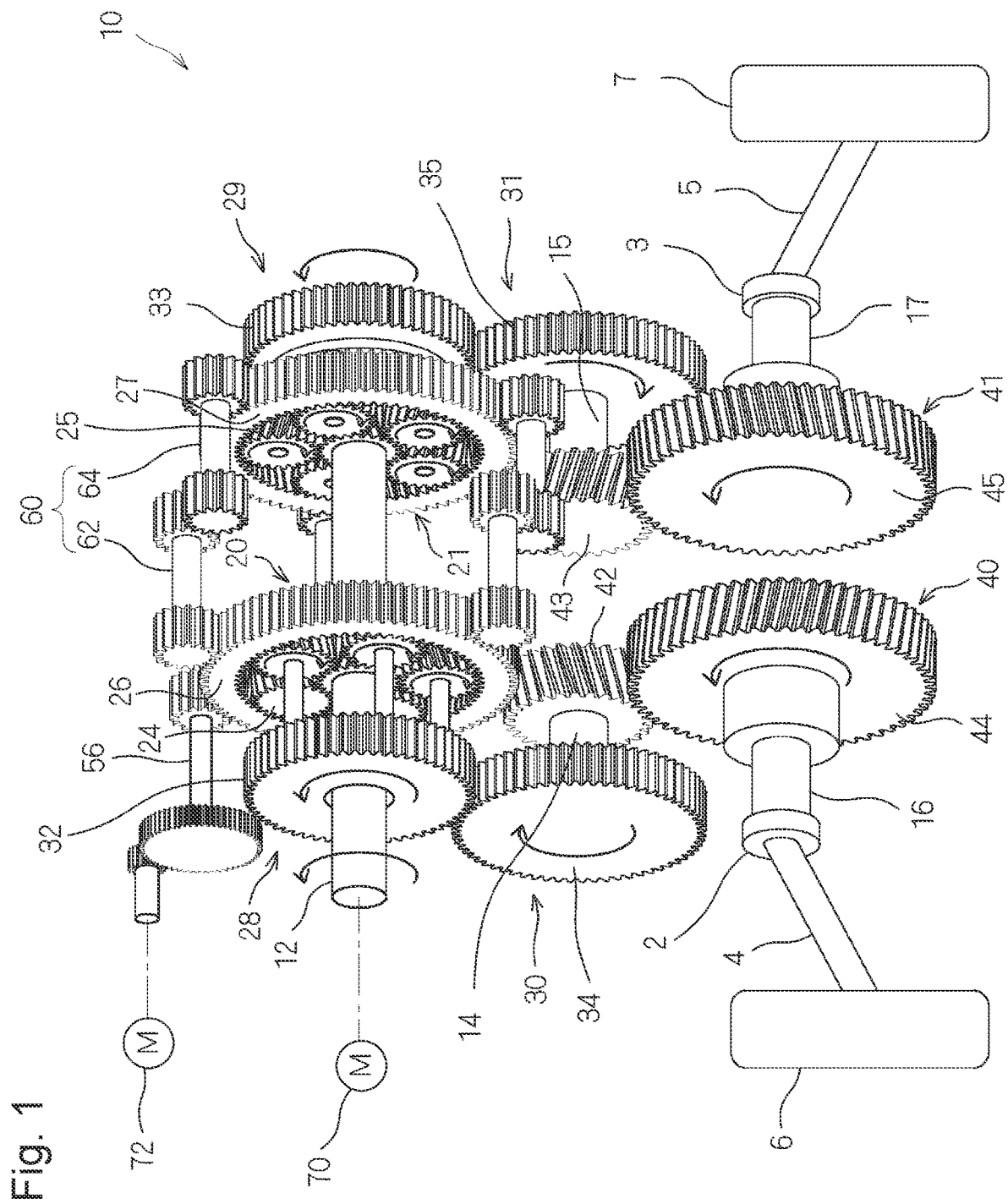
FIG. 1 is an explanatory diagram of a drive device (Example 1).
Figure 2:
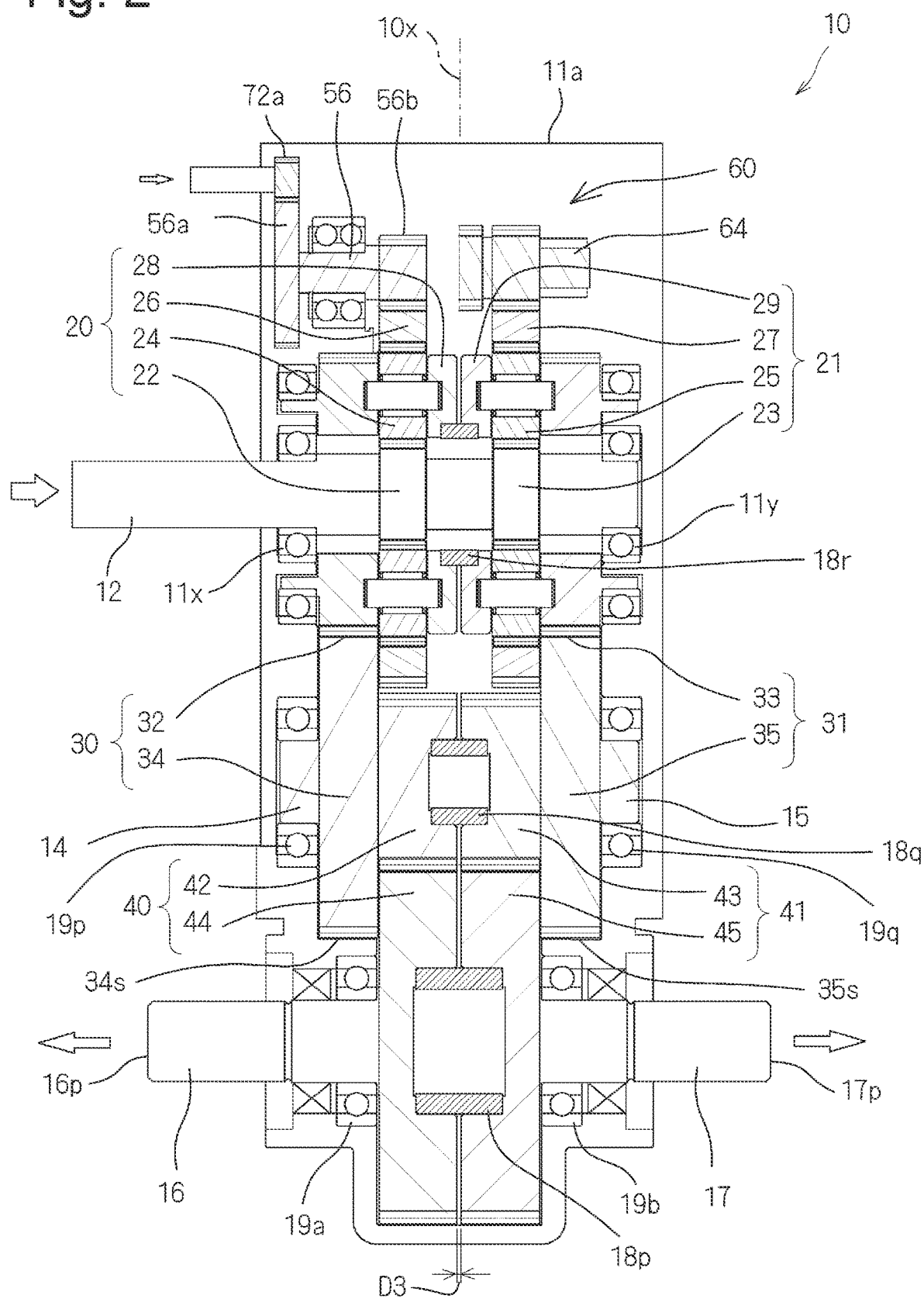
FIG. 2 is a cross sectional view of the drive device (Example 1).

FIG. 1 is an explanatory diagram conceptually illustrating the structure of the drive device 10. FIG. 2 is a cross sectional view of the drive device 10.

As illustrated in FIG. 1, in the drive device 10, rotational torque is input from a drive motor 70 to an input shaft 12, and the rotational torque is distributed to first and second output shafts 16 and 17 corresponding to axle shafts. The rotational torque is transmitted from the first and second output shafts 16 and 17 through constant velocity joints 2 and 3 and drive shafts 4 and 5 to right and left wheels 6 and 7.

As illustrated in FIG. 1 and FIG. 2, the drive device 10 includes the input shaft 12, first and second planetary gear mechanisms 20 and 21, first and second rotation transmission mechanisms 30 and 31, first and second intermediate shafts 14 and 15, first and second deceleration mechanisms 40 and 41, the first and second output shafts 16 and 17, and a differential mechanism 60.

As illustrated in FIG. 2, the input shaft 12 is rotatably supported by bearings 11x and 11b on a main housing 11a. The first and second planetary gear mechanisms 20 and 21 are coupled to the input shaft 12 to be adjacent to each other in the axial direction of the input shaft 12.

The first and second planetary gear mechanisms 20 and 21 respectively include external sun gears 22 and 23, a plurality of planetary gears 24 and 25, ring gears 26 and 27, and planetary carriers 28 and 29.

Figure 3:
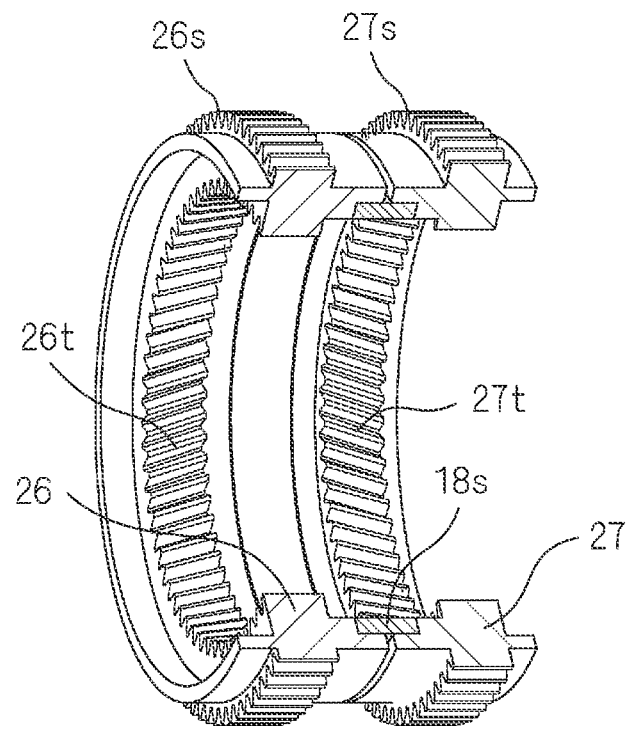
FIGS. 3 (a) and 3 (b) are explanatory diagrams of a ring gear and a planetary gear of a planetary gear mechanism, and an external sun gear (Example 1).
Figure 3:
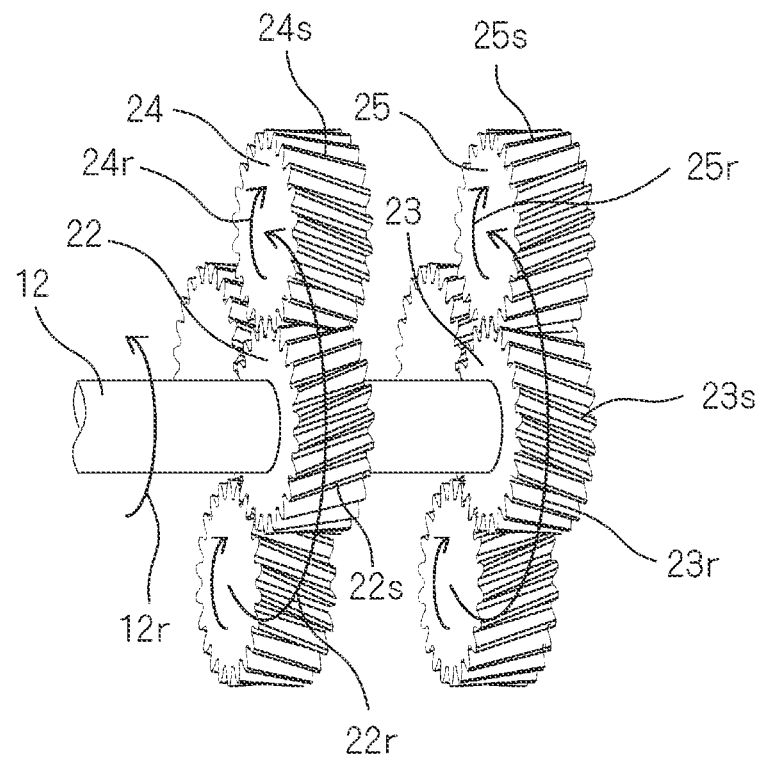
Figure 4:
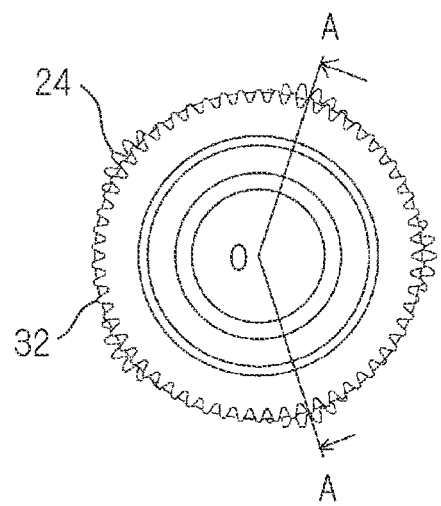
FIGS. 4 (a), 4 (b) and 4 (c) are explanatory diagrams of a planetary carrier (Example 1).
Figure 4:
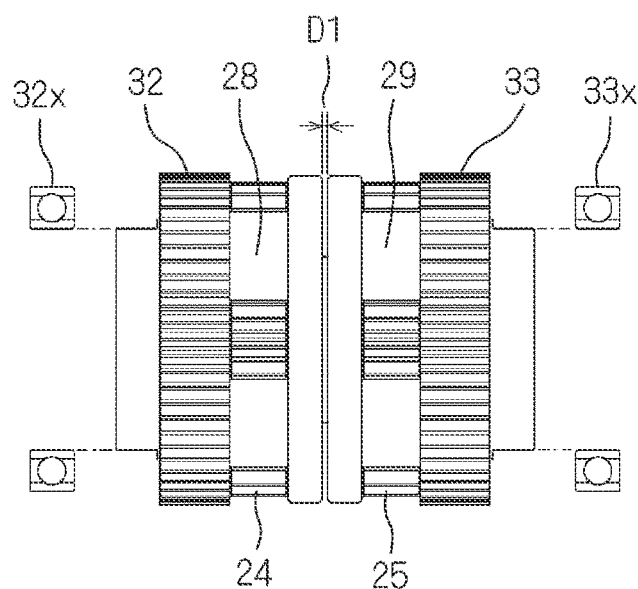
Figure 4:
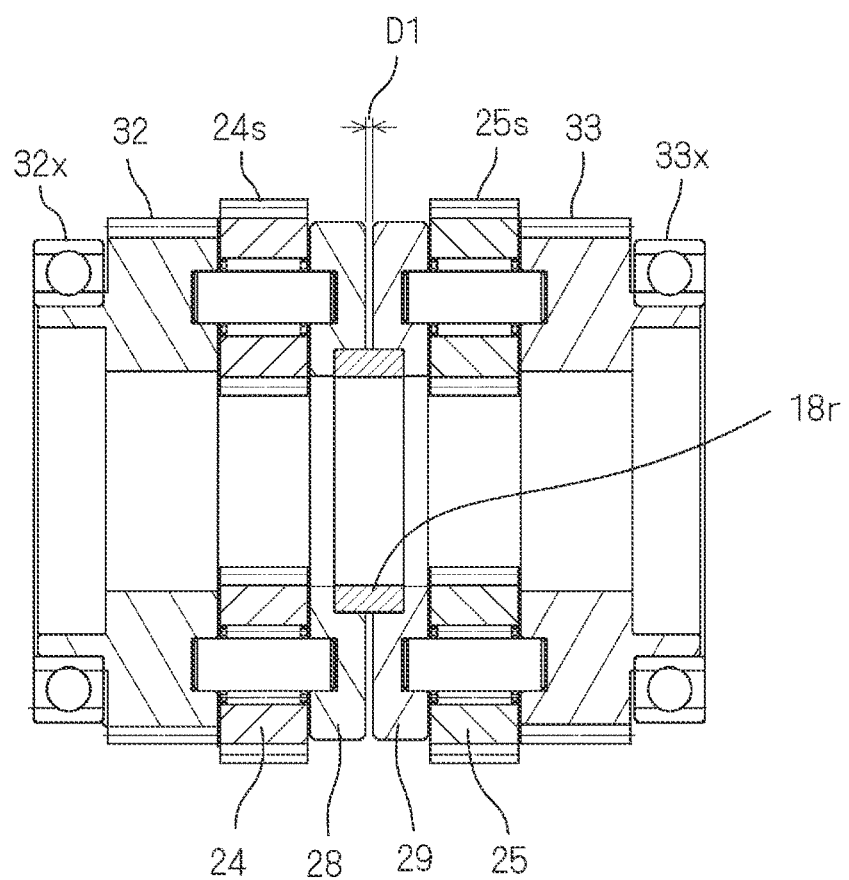

FIGS. 3 (a) to 5 (c) are explanatory diagrams of the first and second planetary gear mechanisms 20 and 21. FIG. 3 (a) is an explanatory diagram of the ring gears 26 and 27. FIG. 3 (b) illustrate mesh between the external sun gears 22 and 23 and the planetary gears 24 and 25, in which some of the planetary gears 24 and 25 are illustrated. FIGS. 4 (a), 4 (b) and 4 (c) are explanatory diagrams of the planetary carriers 28 and 29.

Figure 5:
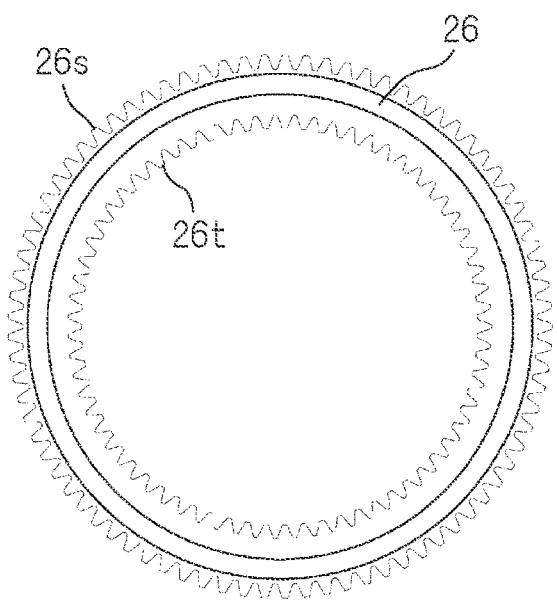
FIGS. 5 (a), 5 (b) and 5 (c) are explanatory diagrams of the ring gear (Example 1).
Figure 5:
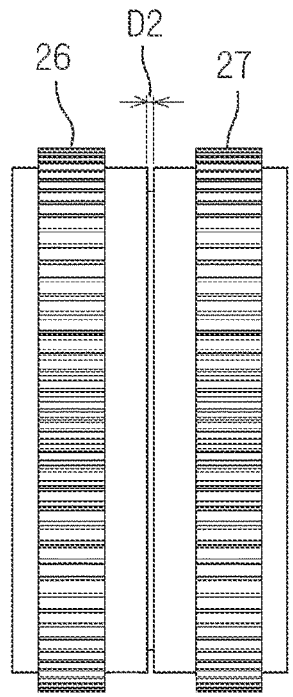
Figure 5:
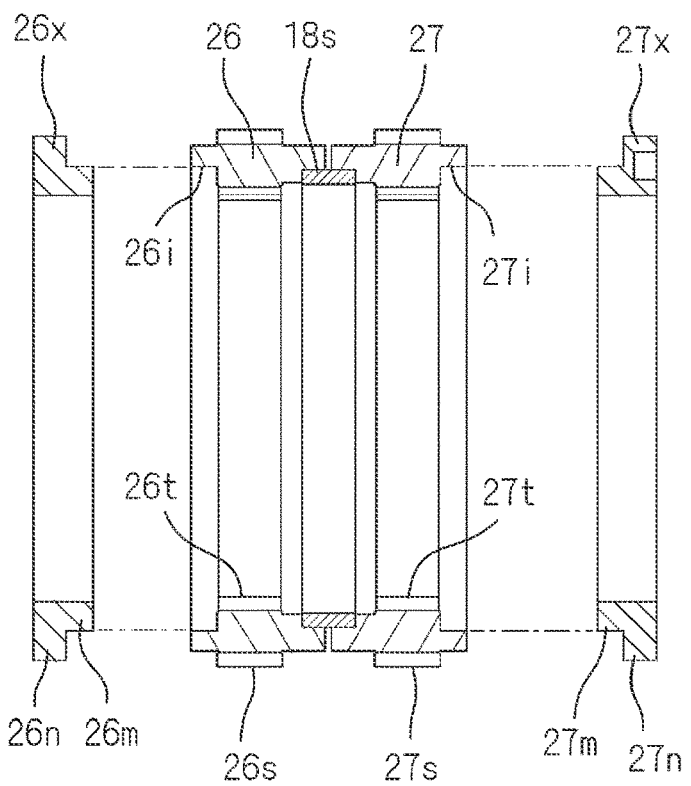

FIG. 4 (a) is a front view, FIG. 4 (b) is a side view, and FIG. 4 (c) is a cross sectional view taken on line A-O-A of FIG. 4 (a). FIGS. 5 (a), 5 (b) and 5 (c) are explanatory diagrams of the ring gears 26 and 27. FIG. 5 (a) is a front view, FIG. 5 (b) is a side view, and FIG. 5 (c) is a cross sectional view.

As illustrated in FIG. 3(b), the external sun gears 22 and 23 are fixed to the input shaft 12, and have external teeth 22s and 23s formed coaxially with the input shaft 12.

The planetary gears 24 and 25 have external teeth 24s and 25s that respectively mesh with the external teeth 22s and 23s of the external sun gears 22 and 23. The planetary gears 24 and 25 are rotatably supported by the planetary carriers 28 and 29 (see FIG. 4(c)) in such a manner that when the input shaft 12 rotates in a direction of an arrow 12r, the planetary gears revolve respectively in directions of arrows 22r and 23r while rotating respectively in directions of arrows 24r and 25r around the external sun gears 22 and 23.

As illustrated in FIGS. 4 (a) to 4 (c), the planetary carriers 28 and 29 rotatably supporting the planetary gears 24 and 25 are relatively rotatably coupled through a bearing 18r to each other on first end sides thereof adjacent to each other in the axial direction, and are rotatably supported by bearings 32x and 33x on second end sides thereof. The planetary carriers 28 and 29 respectively have, on the second end sides, external gears 32 and 33 that are externally toothed gears coaxial with the input shaft 12, and adjacent respectively to the planetary gears 24 and 25 in the axial direction.

Since the first end sides of the planetary carriers 28 and 29 are thus relatively rotatably coupled to each other through the bearing 18r, as compared with a case where the planetary carriers 28 and 29 are rotatably supported at the both ends by different bearings, the planetary carriers 28 and 29 can be disposed to be close to each other, and thus, a distance D1 between the planetary carriers 28 and 29 can be reduced to reduce the drive device 10 in size.

Since the rotation of the planetary carriers 28 and 29 is transmitted from the external gears 32 and 33 to the output shafts 16 and 17, the planetary carriers 28 and 29 coupled to each other through the bearing 18r need to have high rigidity. The relative rotation of the planetary carriers 28 and 29 is caused in accordance with a difference in the rotational speed between the output shafts 16 and 17, and hence has a comparatively low speed. Therefore, as the bearing 18r disposed between the planetary carriers 28 and 29, a sliding bearing having high rigidity can be used, and when a sliding bearing is used, it is preferably coated with DLC or the like having a small friction coefficient.

As illustrated in FIGS. 3 (*a*), FIGS. 5 (*a*), 5 (*b*) and 5 (*c*), the ring gears 26 and 27 are hollow cylindrical members, and respectively have, on inner circumferential surfaces thereof, internal teeth 26*t* and 27*t* meshing with the external teeth 24*s* and 25*s* of the planetary gears 24 and 25, and have external teeth 26*s* and 27*s* on outer circumferential surfaces thereof. The ring gears 26 and 27 are relatively rotatably coupled to each other through a bearing 18*s* on first end sides thereof adjacent to each other in the axial direction, and are rotatably supported on second end sides thereof by bearings 26*x* and 27*x*.

Since the first end sides of the ring gears 26 and 27 are thus relatively rotatably coupled to each other through the bearing 18*s*, as compared with a case where the ring gears 26 and 27 are rotatably supported at the both ends by different bearings, the ring gears 26 and 27 can be disposed to be close to each other, and thus, a distance D2 between the ring gears 26 and 27 can be reduced to reduce the drive device 10 in size.

The ring gears 26 and 27 rotate in accordance with a difference in the rotational speed between the output shafts 16 and 27, and the maximum rotational speed is about ⅟₁₀₀ of the rotational speed of the input shaft 12. Therefore, a sliding bearing can be sufficiently used as the bearings 26*x* and 27*x* of the ring gears 26 and 27. When a sliding bearing is used as the bearings 26*x* and 27*x*, the sliding bearing is preferably coated with DLC or the like having a small friction coefficient.

The bearings 26*x* and 27*x* are contrived so as not to interfere with intermediate gears 34 and 35 of the rotation transmission mechanisms 30 and 31 described below in assembling the drive device 10.

For example, as illustrated in FIG. 5(*c*), the bearings 26*x* and 27*x* respectively have small diameter portions 26*m* and 27*m* in sliding contact with inner circumferential surfaces 26*i* and 27*i* on the first end sides of the ring gears 26 and 27, and large diameter portions 26*n* and 27*n* having a larger outer diameter than the small diameter portions 26*m* and 27*m*. Each of the small diameter portions 26*m* and 27*m* is in an O shape, and is continuous in the circumferential direction. On the other hand, each of the larger diameter portions 26*n* and 27*n* is in a C shape. In other words, the large diameter portions 26*n* and 27 are partly notched in the circumferential direction, so that the intermediate gears 34 and 35 respectively meshing with the external gears 32 and 33 cannot interfere with the large diameter portions 26*n* and 27*n* in a state where a part of the external gears 32 and 34 of the planetary carriers 28 and 29 (see FIG. 4(*c*)) inserted into the large diameter portions 26*n* and 27*n*.

As illustrated in FIG. 2, the outer diameter of the external gears 32 and 33 (namely, the addendum circle diameter of the external teeth of the external gears 32 and 33) of the planetary carriers 28 and 29 is set to be smaller than the inner diameter of the ring gears 26 and 27 (namely, the addendum circle diameter of the internal teeth 26*t* and 27*t* of the ring gears 26 and 27). Thus, the drive device 10 can be preferably reduced in size. In other words, even when the external gears 32 and 33 of the planetary carriers 28 and 29 are disposed to be close to the ring gears 26 and 27, a bearing of the differential mechanism 60 can be disposed outside in a radial direction of the external gears 32 and 33 of the planetary carriers 28 and 29. Besides, a lubricating oil can be easily supplied to the inside (the planetary gears 24 and 25, the external sun gears 22 and 23, and the internal teeth 26*t* and 27*t* of the ring gears 26 and 27) of the planetary gear mechanisms 20 and 21. Furthermore, the rotation transmission mechanisms 30 and 31 can be reduced in size.

The gears of the first and second planetary gear mechanisms 20 and 21 may be spur gears, but as illustrated in FIG. 1, FIGS. 3 (*a*) and 3 (*b*), helical gears having helix angles mutually in opposite directions are preferably used. When helical gears are used, it is possible to obtain effects of increasing a contact ratio, increasing mesh strength, and suppressing noise otherwise caused in rotation as compared with a case where spur gears are used.

In order to obtain further effects, the directions of the helix angles of the helical gears are preferably determined in accordance with the rotation direction of the output shafts 16 and 17 at the time of usual drive, namely, in driving a vehicle forward. For example, the directions are preferably selected in such a manner that the respective members rotate in directions illustrated with arrows in FIG. 1, FIGS. 3 (*a*) and 3 (*b*) to cause the ring gears 26 and 27 to come close to each other by thrust generated by the helical gears.

Besides, since the relative rotation of the ring gears 26 and 27 is suppressed to some extent because the ring gears 26 and 27 are pressed against the end surfaces of the sliding bearing 18*s* disposed therebetween, increase of the difference in the rotational speed between the output shafts 16 and 17 is suppressed.

As illustrated in FIG. 1 and FIG. 2, the first and second intermediate shafts 14 and 15 are supported in parallel to the input shaft 12 and rotatably. Although the first and second intermediate shafts 14 and 15 are illustrated to be disposed coaxially in the drawings, these may be disposed not coaxially but in parallel to each other.

As illustrated in FIG. 2, the first and second intermediate gears 34 and 35 and first and second input-side gears 42 and 43 are respectively fixed to the first and second intermediate shafts 14 and 15. The first and second intermediate shafts 14 and 15 are relatively rotatably coupled to each other through a bearing 18*q* on first end sides thereof opposing each other, and are rotatably supported respectively by bearings 19*p* and 19*q* on second end sides thereof.

The first and second rotation transmission mechanisms 30 and 31 respectively include the external gears 32 and 33 rotating together with the planetary carriers 28 and 29, and the first and second intermediate gears 34 and 35 fixed to the first and second intermediate shafts 14 and 15. The first and second intermediate gears 34 and 35 respectively have external teeth 34*s* and 35*s* respectively meshing with the external gears 32 and 33. The external gears 32 and 33 and the external teeth 34*s* and 35*s* of the first and second intermediate gears 34 and 35 may be spur gears, or may be helical gears as described in Modification Example 1 below.

The first and second output shafts 16 and 17 are supported in parallel to the input shaft 12 and rotatably. The first and second output shafts 16 and 17 are disposed coaxially with each other, and first and second output gears 44 and 45 are respectively fixed to the first and second output shafts 16 and 17.

Figure 6:
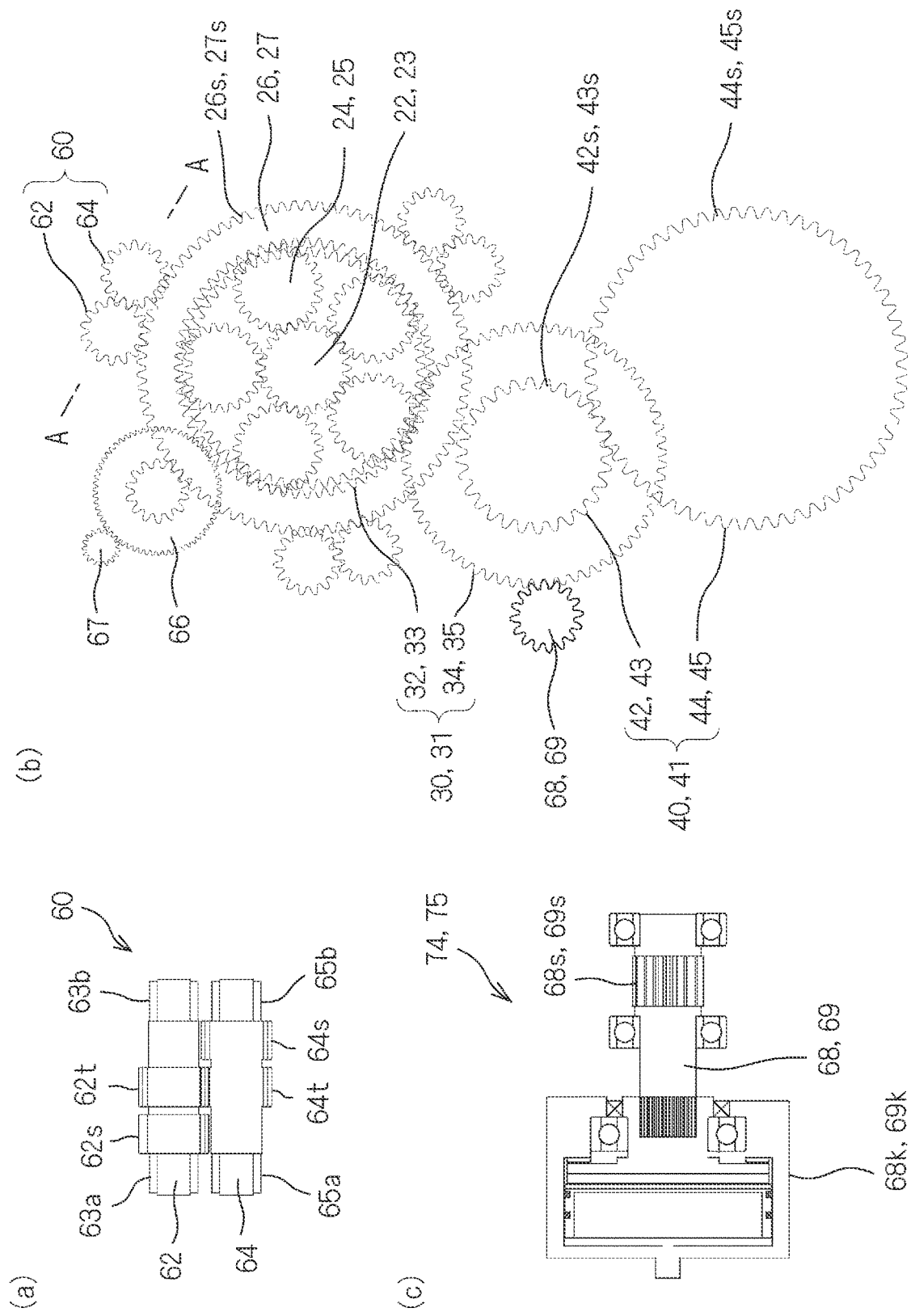
FIGS. 6 (a), 6 (b) and 6 (c) are explanatory diagrams of a differential mechanism and a brake mechanism (Example 1).

The first and second deceleration mechanisms 40 and 41 respectively include the first and second input-side gears 42 and 43 respectively fixed to the first and second intermediate shafts 14 and 15, and the first and second output gears 44 and 45 respectively fixed to the first and second output shafts 16 and 17. FIG. 6(*b*) is an explanatory diagram illustrating mesh among gears. As illustrated in FIG. 6(*b*), the first and second input-side gears 42 and 43 respectively have external teeth 42*s* and 43*s* coaxial with the first and second intermediate shafts 14 and 15. The first and second output gears 44 and 45 respectively have external teeth 44*s* and 45*s* respectively meshing with the external teeth 42s and 43s of the first and second input-side gears 42 and 43.

As illustrated in FIG. 2, the first and second output shafts 16 and 17 disposed coaxially with each other are relatively rotatably coupled to each other through a bearing 18p on first end sides thereof opposing each other. The first and second output shafts 16 and 17 are rotatably supported by bearings 19a and 19b on second end sides thereof opposite of the bearing 18p to the first and second output gears 44 and 45.

Figure 7:
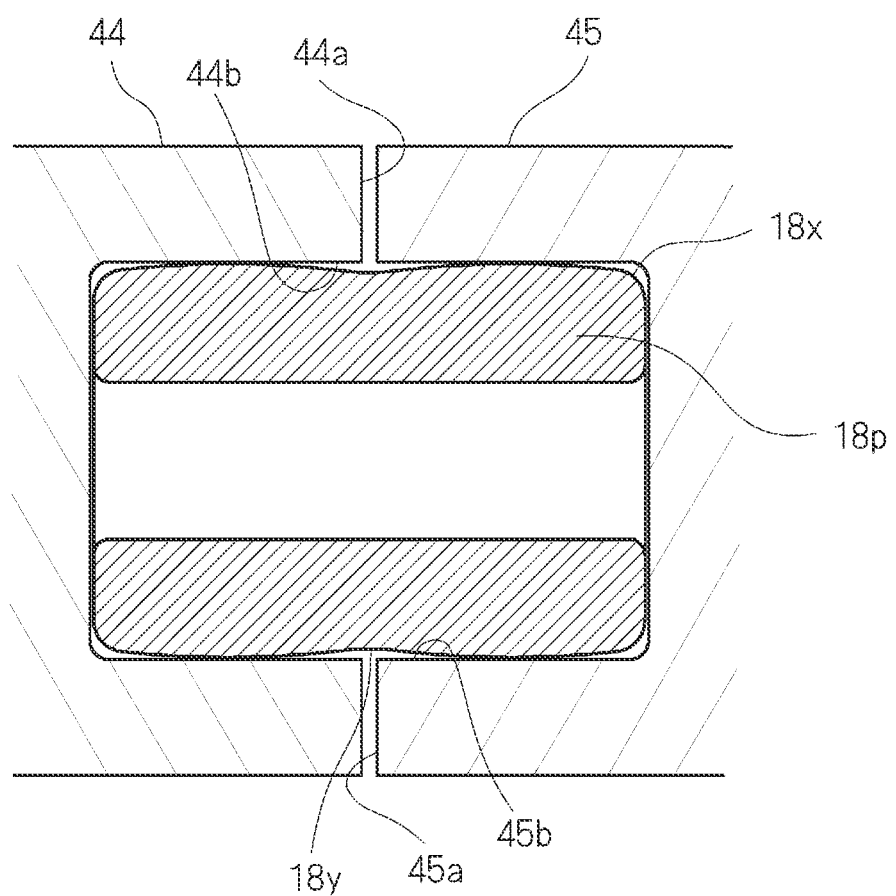
FIG. 7 is a cross sectional view of a portion close to a bearing (Example 1).

FIG. 7 is a cross sectional view of a portion in the vicinity of the bearing 18p. As illustrated in FIG. 7, the bearing 18p is, for example, a sliding bearing in a hollow cylindrical shape. The bearing 18p may be in a solid cylindrical shape. The bearing 18p is disposed in cylindrical holes 44b and 45b formed on side surfaces 44a and 45a opposing each other of the first and second output gears 44 and 45 to be coaxial with the first and second output gears 44 and 45. The bearing 18p may be disposed between the first and second output shafts 16 and 17 to be coaxial with the first and second output shafts 16 and 17.

It is preferable that both end corners 18x in the axial direction of the bearing 18p are rounded, or that a recess 18y is formed on the whole circumference so as to slightly pinch the outer circumferential surface of the bearing 18p in a center position in the axial direction because thus, an excessive force can be prevented from being applied even if the output gears 44 and 45 are slightly tilted, or the output shafts 16 and 17 are slightly bent.

Any of the other bearings 18q, 18r and 18s may be disposed in the same manner as the bearing 18p, and both end corners in the axial direction may be rounded, or a recess may be formed on the whole circumference so as to slightly pinch the outer circumferential surface in a center portion in the axial direction.

A difference in rotational speed between the vehicle wheels is largest in turning at a low speed with a small radius, and this rotational speed difference is 50 rpm or less, and is very small. Besides, occurrence of a large rotational speed difference derived from vehicle "matagi" or a difference in a friction coefficient of one wheel in high speed driving causes a problem in safety, and the occurrence should be suppressed. In other words, the output shafts 16 and 17 are required neither to have a large rotational speed difference nor to cause a large rotational speed difference. Therefore, as the bearing 18p provided between the first and second output gears 44 and 45, a sliding bearing or the like having a large load capacity, having a larger friction coefficient than a ball bearing, and having a rotation suppression effect is preferably used.

Since the first end sides of the first and second output shafts 16 and 17 are relatively rotatably coupled to each other through the bearing 18p, as compared with a case where the first and second output gears 44 and 45 are rotatably supported at the both ends by different bearings, a distance D3 between the first and second output gears 44 and 45 can be reduced, and a distance between the second ends of the first and second output shafts 16 and 17 can be reduced. As a result, the drive device 10 can be further reduced in size, and the drive shaft can be further increased in length to configure a vehicle suspension system that has a smaller camber angle, and makes vehicle driving further stable.

As illustrated in FIG. 1, the external teeth 44s and 45s of the first and second output gears 44 and 45 are helical gears. Specifically, the first and second output gears 44 and 45 have helical gears having helix angles mutually in opposite directions. The directions of the helix angles of the helical gears of the first and second output gears 44 and 45 are determined so as to cause the first and second output gears 44 and 45 to come close to each other in driving the vehicle forward to cause the first and second output shafts 16 and 17 to come close to each other. As a result, at the time of usual drive, backlash in the axial direction of the first and second output shafts 16 and 17 against the bearing 18p can be suppressed by thrust in the axial direction generated by the helical gears, and thus, the vehicle driving can be stabilized.

For example, in what is called a "matagi" state where a road surface in contact with one tire out of tires installed on the outer circumferences of the wheels 6 and 7 has a small friction coefficient, a drive force is to be collected to the tire corresponding to the small friction coefficient to increase the rotation, but a part of the motion energy is changed to a force causing the output gears 44 and 45 to come close to each other owing to the effect of the helical gears, and thus, the rotation increase is suppressed by the bearing 18p.

FIG. 6(a) is a cross sectional view of the differential mechanism 60 taken on line A-A of FIG. 6(b). FIG. 6(b) is an explanatory diagram illustrating mesh among gears of the drive device 10 taken along the axial direction. FIG. 6(c) is an explanatory diagram of brake mechanisms 74 and 75. As illustrated in FIG. 1, FIG. 6(a) and FIG. 6(b), the differential mechanism 60 includes first and second differential gear members 62 and 64. The first and second differential gear members 62 and 64 are rotatably supported respectively by bearings 63a and 63b; and 65a and 65b, and respectively include gears 62s and 64s respectively meshing with the external teeth 26s and 27s of the ring gears 26 and 27, and other gears 62t and 64t. The first and second differential gear members 62 and 64 are coupled to each other to be rotatable in mutually opposite directions with the latter gears 62t and 64t meshing with each other. Owing to the differential mechanism 60, the ring gears 26 and 27 rotate in mutually opposite directions.

It is noted that the differential mechanism may connect the ring gear 26 of the first planetary gear mechanism 20 and the ring gear 27 of the second planetary gear mechanism 21 to each other in such a manner as to rotate the ring gears 26 and 27 in the mutually opposite directions. Therefore, for example, the differential gear members 62 and 64 may be configured to mesh with the internal teeth 26t and 27t of the ring gears 26 and 27.

As illustrated in FIG. 2, with respect to an imaginary plane 10x perpendicular to the input shaft 12, the first planetary gear mechanism 20, the first rotation transmission mechanism 30 and the first deceleration mechanism 40 are disposed on one side (on the left side in FIG. 2), and the second planetary gear mechanism 21, the second rotation transmission mechanism 31 and the second deceleration mechanism 41 are disposed on the other side (on the right side in FIG. 2). The first planetary gear mechanism 20, the first rotation transmission mechanism 30 and the first deceleration mechanism 40 are disposed symmetrically to the second planetary gear mechanism 21, the second rotation transmission mechanism 31 and the second deceleration mechanism 41 with respect to the imaginary plane 10x. Since the structure is thus symmetric, the same components can be used, and the number of types of components can be reduced.

Although not illustrated in the drawings, the first planetary gear mechanism 20, the first rotation transmission mechanism 30 and the first deceleration mechanism 40 may be disposed substantially symmetrically to the second planetary gear mechanism 21, the second rotation transmission mechanism 31 and the second deceleration mechanism 41 with respect to the imaginary plane 10x. Also when these mechanisms are thus substantially symmetrically disposed, the number of types of components can be reduced.

The term being symmetrically disposed refers to a case where perpendicular lines drawn from corresponding points on both sides of an imaginary plane to the imaginary plane have the same position of feet and the same length of the perpendicular lines. The term being substantially symmetrically disposed refers to a case where perpendicular lines drawn from corresponding points on both sides of an imaginary plane to the imaginary plane have the same length of the perpendicular lines but have different positions of feet of the perpendicular lines, and symmetry is obtained through movement in parallel to the imaginary plane.

For example, if the first and second intermediate shafts 14 and 15 are not disposed coaxially with each other, when these are substantially symmetrically disposed, the first and second rotation transmission mechanisms 30 and 31 can employ the same structure and the first and second deceleration mechanisms 40 and 41 can employ the same structure. When these are substantially symmetrically disposed, the first and second rotation transmission mechanisms 30 and 31 and the first and second deceleration mechanisms 40 and 41 may cross the imaginary plane 10x.

The first and second differential gear members 62 and 64 of the differential mechanism 60 are disposed preferably substantially symmetrically to each other with respect to the imaginary plane 10x.

In the drive device 10, the rotational torque input to the input shaft 12 is distributed to the first planetary gear mechanism 20 and the second planetary gear mechanism 21, and output from the first output shaft 16 through the first planetary gear mechanism 20, the first rotation transmission mechanism 30 and the first deceleration mechanism 40, and output from the second output shaft 17 through the second planetary gear mechanism 21, the second rotation transmission mechanism 31, and the second deceleration mechanism 41.

As illustrated in FIG. 6(b) and FIG. 6(c), the brake mechanisms 74 and 75 may be provided. In each of the brake mechanisms 74 and 75, a brake device 68k or 69k is connected to one end of a rotation member 68 or 69 rotatably supported. The rotation member 68 or 69 is rotatably supported and has external teeth 68s or 69s that mesh with the external teeth 34s or 35s of the intermediate gears 34 or 35. The number of the external teeth 68s or 69s of the rotation member 68 or 69 is preferably smaller than the number of the external teeth 34s or 35s of the intermediate gears 34 or 35. The brake devices 68k and 69k brake rotation of the rotation members 68 and 69 by using, for example, a mechanical friction force.

The brake mechanisms 74 and 75 may be appropriately provided on paths through which the rotation is transmitted from the input shaft 12 to the output shafts 16 and 17. For example, the rotation members 68 and 69 may be configured to respectively mesh with the external gears 32 and 33. Alternatively, the brake mechanisms may be provided on the input shaft 12, or the first and second intermediate shafts 14 and 15.

In the path through which the rotation is transmitted from the input shaft 12 to the output shafts 16 and 17, acceleration is performed for the output shafts 16 and 17 representing the rotation of wheels to obtain high rotation and low torque. Therefore, when the brake mechanisms 74 and 75 are provided in the path through which the rotation is transmitted from the input shaft 12 to the output shafts 16 and 17, torque necessary for braking can be reduced, and hence an inboard brake in a compact size can be configured as compared with a case employing a disk brake. An inboard brake is a brake to be provided not below a spring of a vehicle suspension system but on a spring corresponding to a part moving together with a vehicle body.

Since the rotation parts respectively corresponding to the right and left wheels are present adjacent to each other in the drive device 10, the two brake mechanisms 74 and 75 respectively braking the right and left wheels can be added in a compact manner.

Besides, the brake mechanisms 74 and 75 may be a brake for braking the vehicle or a parking brake.

As illustrated in FIG. 1 and FIG. 2, a control gear member 56 is provided as a rotation brake mechanism for transmitting rotational torque from a control motor 72. The control gear member 56 is rotatably supported, and has gears 56a and 56b respectively at both ends. The one gear 56a of the control gear member 56 meshes with a gear 72a fixed to a rotation shaft of the control motor 72, and the other gear 56b meshes with the external teeth 26s of the ring gear 26 (see FIG. 3(a)).

It is noted that the control motor 72, the control gear member 56 and the like may be omitted in the structure.

The structure will be further described.

Each of the first and second planetary gear mechanisms 20 and 21 is a decelerator having a sun gear input and a carrier output. Differently from a usual planetary gear mechanism, the ring gears 26 and 27 having the internal teeth 26t and 27t are rotatably supported, and also have external teeth 26s and 27s. In other words, each of the first and second planetary gear mechanisms 20 and 21 is a gear mechanism having two inputs and one output that decelerates rotation inputs from the sun and internal gears and outputs the resultant.

The differential mechanism 60 functions as a diff mechanism that absorbs a difference in track between inside/outside right and left wheels caused when a vehicle turns. The differential mechanism 60 is configured to mesh with the external teeth 26s and 27s of the ring gears 26 and 27 of the first and second planetary gear mechanisms 20 and 21, so as to rotate the ring gears 26 and 27 in the mutually opposite directions at the same speed. The differential mechanism 60 is provided around the ring gears 26 and 27 in number of at least one, and preferably in plural number (three in the drawings).

The first and second planetary gear mechanisms 20 and 21 can be configured in the same structure in using spur gears, and configured in symmetrical structures in using helical gears. When the input shaft 12 is rotatively driven, a force is applied to the ring gears 26 and 27. When rotational torques having the same magnitude are output from the first and second planetary gear mechanisms 20 and 21, forces in the same direction having the same magnitude are applied to the ring gears 26 and 27. In this case, the forces applied to the ring gears 26 and 27 are changed to be in the mutually opposite directions through the differential mechanism 60, and since the forces are thus balanced, the ring gears 26 and 27 do not rotate.

When the two planetary carriers 28 and 29 differently rotate, however, the ring gears 26 and 27 rotate in the mutually opposite directions at the same speed, and the differential gear members 62 and 64 of the differential mechanism 60 also rotate.

When the one ring gear 26 is rotated by the control motor 72, the other ring gear 27 rotates in the opposite direction, and thus, the two planetary carriers 28 and 29 can be rotated differently. When differences in the rotational speed and the drive torque between the first and second output shafts 16 and 27 are controlled by using the control motor 72, the torque vectoring function for distributing a drive force can be realized.

In the drive device 10, forces applied to the gears of the first and second planetary gear mechanisms 20 and 21 are reduced owing to deceleration caused by the first and second deceleration mechanisms 40 and 41, and hence the first and second planetary gear mechanisms 20 and 21 can be reduced in size. When the first and second rotation transmission mechanisms 30 and 31 are used for deceleration, the first and second planetary gear mechanisms 20 and 21 can be further reduced in size.

When the first and second rotation transmission mechanisms 30 and 31 are used for deceleration, two stage deceleration performed by the rotation transmission mechanisms 30 and 31 and the deceleration mechanisms 40 and 41 is provided between the planetary carriers 28 and 29, that is, the outputs of the planetary gear mechanisms 20 and 21, and the first and second output shafts 16 and 17, that is, the outputs of the drive device 10. As a result, the drive device 10 can be further reduced in size and weight.

In other words, when two stage deceleration is performed, the deceleration ratio can be increased as compared with that obtained in performing single stage deceleration. Torque applied to the planetary gear mechanisms 20 and 21 is reduced in accordance with the deceleration ratio, and hence, when the two stage deceleration is performed, the planetary gear mechanisms 20 and 21 and the control motor 72 can be reduced in size as compared with a case of performing single stage deceleration.

Besides, when the two stage deceleration is performed, the outer diameter of the output gears 44 and 45 coupled to the output shafts 16 and 17 can be reduced in size as compared with the case of performing single stage deceleration. When the two stage deceleration is performed, the drive motor 70 and the output shafts 16 and 17 can be easily disposed in parallel with ensuring a center-to-center distance sufficient for disposing flanges and bearings. Therefore, the dimension in the direction perpendicular to the axial direction of the drive device can be reduced.

Besides, since the planetary gear mechanisms 20 and 21 and the control motor 72 can be reduced in size, a center-to-center distance between the control motor 72 and the drive motor 70 can be reduced, and hence, a protruding portion of the drive device 10 can be reduced in size.

When the two stage deceleration is additionally provided, although the mass corresponding to the two stage deceleration is increased, the planetary gear mechanisms 20 and 21 and the control motor 72 can be reduced in size, and hence the masses of the planetary gear mechanisms 20 and 21 and the control motor 72 can be reduced. When the deceleration ratio is appropriately selected, the mass to be reduced in the planetary gear mechanisms 20 and 21 and the control motor 72 can be set to surpass the mass to be increased correspondingly to the two stage deceleration. Accordingly, the addition of the two stage deceleration can reduce the entire mass of the drive device 10.

The deceleration ratio between the planetary carriers 28 and 29 of the planetary gear mechanisms 20 and 21 and the output shafts 16 and 17 is preferably 1.5 or more, and more preferably 2 or more. In the structure of Conventional Example 3, the deceleration ratio between the planetary carrier of the planetary gear mechanism and the output shaft cannot be set to 1.5 or more. When the deceleration ratio is 2 or more, as compared with a drive device using a planetary gear mechanism alone, the dimension of the planetary gear mechanisms 20 and 21 is reduced to about ⅓, and the mass of the planetary gear mechanisms 20 and 21 is reduced to about 1/10 as described below.

In an actual vehicle, a deceleration ratio between a motor and an output shaft is about 10. In a planetary gear mechanism having an external sun gear input and a planetary carrier output, a deceleration ratio is represented as $Zr/Zs+1$, wherein the number of teeth of an external sun gear is $Zs$ and the number of internal teeth of a ring gear is $Zr$. When a drive device includes a planetary gear mechanism alone as in Conventional Example 2-1 and Conventional Example 2-2, $Zr/Zs=9$ assuming that $Zr/Zs+1=10$. In Example 1, assuming that the deceleration between the planetary gear mechanisms 20 and 21 and the output shafts 16 and 17 is 1.5, and that $(Zr/Zs+1)\times1.5=10$, $Zr/Zs=5.7$. Specifically, when the externally sun gears have the same dimension, a diameter of the internal teeth of the ring gear is reduced by $5.7/9=0.63$ times as compared with that in the drive device including the planetary gear mechanism alone. If the deceleration ratio between the planetary gear mechanisms 20 and 21 and the output shafts 16 and 18 is 2, $Zr/Zs=4$, and hence the diameter of the internal teeth of the ring gear is reduced by $4/9=0.44$ times as compared with that in the drive device including the planetary gear mechanism alone.

It is assumed that the planetary gear mechanism has a module of, for example, 2.5 in the drive device including the planetary gear mechanism alone. The module of the planetary gear mechanism is reduced by providing deceleration between the planetary gear mechanism and the output shaft. The square of the module or larger (usually about 2.8) can be transmitted as torque. Assuming that the module has a small value of 2, in a case where deceleration is additionally provided between the planetary gear mechanism and the output shaft, if the deceleration ratio between the planetary gear mechanism and the output shaft is 1.5, since the torque is in proportion to the deceleration ratio, the module of the planetary gear mechanism is $2.5/(1.5)^{1/2}=2.04$. Specifically, the module of the planetary gear mechanism is reduced by $2.04/2.5=0.816$ times. Similarly, if the deceleration ratio is 2, the module is reduced by $1.77/2.5=0.708$ times.

In consideration of both the gear ratio and the module of the planetary gear mechanism, if the deceleration ratio between the planetary gear mechanism and the output shaft is set to 1.5, the dimension of the planetary gear mechanism can be reduced by $0.63\times0.816=0.514$ times as compared with that of the drive device including the planetary gear mechanism alone, and if the deceleration ratio is set to 2, the dimension can be reduced by $0.44\times0.708=0.311$ times.

Owing to the differential mechanism 60, the planetary carriers 28 and 29 have the same rotational torque, and hence rotational torque necessary for the control motor 72 may be one corresponding to a rotational torque difference between the planetary carriers 28 and 29, which is smaller than the rotational torque of the drive motor 70. In addition, since the deceleration mechanism is inserted, the rotational torque of the drive motor 70 is small as compared with the rotational torque of the output shafts 16 and 17. Therefore, the rotational torque necessary for the control motor 72 may be very small as compared with the rotational torque of the output shafts 16 and 17.

Besides, since the first and second output shafts 16 and 17 are disposed to respectively align with the first and second planetary gear mechanisms 20 and 21, the dimension between tip ends 16p and 17p of the first and second output shafts 16 and 17 can be reduced as compared with a case where the output shafts are disposed on both sides of the first and second planetary gear mechanisms 20 and 21. Therefore, the drive shaft can be increased in length to easily configure a vehicle suspension system that makes vehicle driving more stable.

Besides, since the first and second intermediate shafts 14 and 15 are provided, a distance between the input shaft 12 and the first and second output shafts 16 and 17 can be increased to improve the entire structure and mounting on the vehicle.

Since the planetary carriers 28 and 29 of the first and second planetary gear mechanisms 20 and 21 respectively have the external gears 32 and 33 on the outside in the axial direction, the distance between the tip ends 16p and 17p of the first and second output shafts 16 and 17 can be reduced by disposing the first and second deceleration mechanisms 40 and 41 between the first and second rotation transmission mechanisms 30 and 31. Thus, the drive device 10 can be further reduced in size, and the drive shafts 4 and 5 provided between the first and second output shafts 16 and 17 and the right and left wheels 6 and 7 can be further increased in length to configure a vehicle suspension system that makes vehicle driving furthermore stable.

It is not indispensable to relatively rotatably couple the first end sides of the first and second output shafts 16 and 17 to each other through the bearing 18p, to relatively rotatably couple the first end sides of the first and second intermediate shafts 14 and 15 to each other through the bearing 18q, to relatively rotatably couple the first end sides of the planetary carriers 28 and 29 to each other through the bearing 18r, and to relatively rotatably couple the first end sides of the ring gears 26 and 27 to each other through the bearing 18s. The drive device 10 can be reduced in size even when these components are not relatively rotatably coupled through the bearings 18p, 18q, 18r and 18s but these components are rotatably supported respectively on the first end sides thereof by bearings.

Next, a specific example of the structure of the drive device 10 will be described.

The first and second planetary gear mechanisms 20 and 21 are as follows: The number of the external teeth 22s or 23s of each of the external sun gears 22 and 23 is 23, the number of the external teeth 24s or 25s of each of the planetary gears 24 and 25 is 22, and the number of the internal teeth 26t or 27t of each of the ring gears 26 and 27 is 67. Since torque is input to the two external sun gears 22 and 23, and is output from the planetary carriers 28 and 29, the deceleration ratio is (67/23+1) 3.913. The number of planetary gears 24 and 25 that can be disposed is a divisor of a sum of the numbers of teeth of the external sun gears 22 and 23, and the ring gears 26 and 27, and therefore, the number of planetary gears disposed is a divisor of 67+23=90, namely, 5. The number of teeth of the planetary gears 24 and 25, namely, 23, is relatively prime to 5 that is the number of the planetary gears 24 and 25 disposed, 23 that is the number of teeth of the external sun gears 22 and 23, and 67 that is the number of teeth of the internal teeth 26t and 27t of the ring gears 26 and 27, namely, has no common divisor except for 1 with 23, 67 and 5. Therefore, the mesh of the external teeth 24s and 25s of the planetary gears 24 and 25 with the internal teeth 26t and 27t of the ring gears 26 and 27, and that with the external teeth 22s and 23s of the external sun gears 22 and 23 are not in the same state, but they mesh with one another in slightly different states, small noise is caused, and the rotation is continuously transmitted. The external teeth 24s and 25s of the planetary gears 24 and 25, the internal teeth 26t and 27t of the ring gears 26 and 27, and the external teeth 22s and 23s of the external sun gears 22 and 23 have the same module of 1.75.

Outputs from the planetary carriers 28 and 29 are respectively decelerated by the first and second rotation transmission mechanisms 30 and 31 to be transmitted to the first and second deceleration mechanisms 40 and 41.

The number of teeth of each of the external gears 32 and 33 is 52, and the number of the external teeth 34s or 35s of each of the intermediate gears 34 and 35 meshing with them is 68. The eternal gears 32 and 33 and the external teeth 34s and 35s of the intermediate gears 34 and 35 have a module of 2. Since the rotation transmission mechanisms 30 and 31 respectively decelerate the planetary gear mechanisms 20 and 21, torque to be transmitted is increased correspondingly to the deceleration ratio, and hence, needs to have a value larger than 1.75, that is, the module of the planetary gear mechanisms 20 and 21.

The rotation transmitted to the intermediate gears 34 and 35 is decelerated by the deceleration mechanisms 40 and 41 to be transmitted to the output shafts 16 and 17, and thus, what is called two stage deceleration is performed. The number of the external teeth 42s or 43s of the input-side gear 42 or 43 attached to the intermediate shaft 14 or 15 is 27, and the number of the external teeth 44s or 45s of the output gear 44 or 45 attached to the output shaft 16 or 17 is 49. The external teeth 42s and 43s of the input-side gears 42 and 43, and the external teeth 44s and 45s of the output gears 44 and 45 have a module of 2.5.

The module is increased in the order of deceleration disposed closer to the output shafts 16 and 17, that is, the final output ends, and acceleration is not performed at all during the transmission of the rotation from the drive motor 70 to the output shafts 16 and 17. Therefore, efficiency is better as compared with a case where deceleration is performed after performing acceleration once during the transmission.

Figure 15:
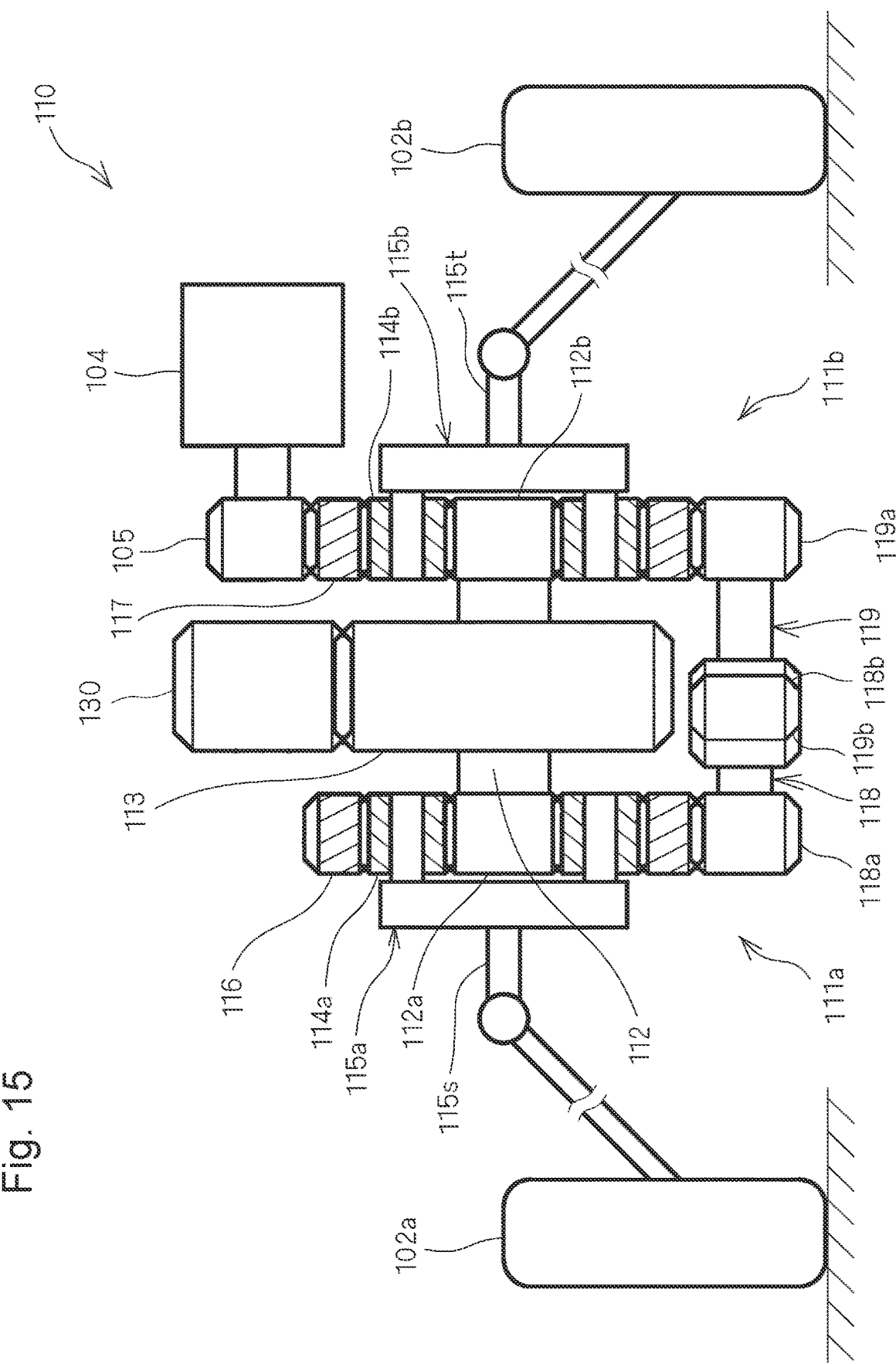
FIG. 15 is an explanatory diagram of a drive device (Conventional Example 2-2).
Figure 16:
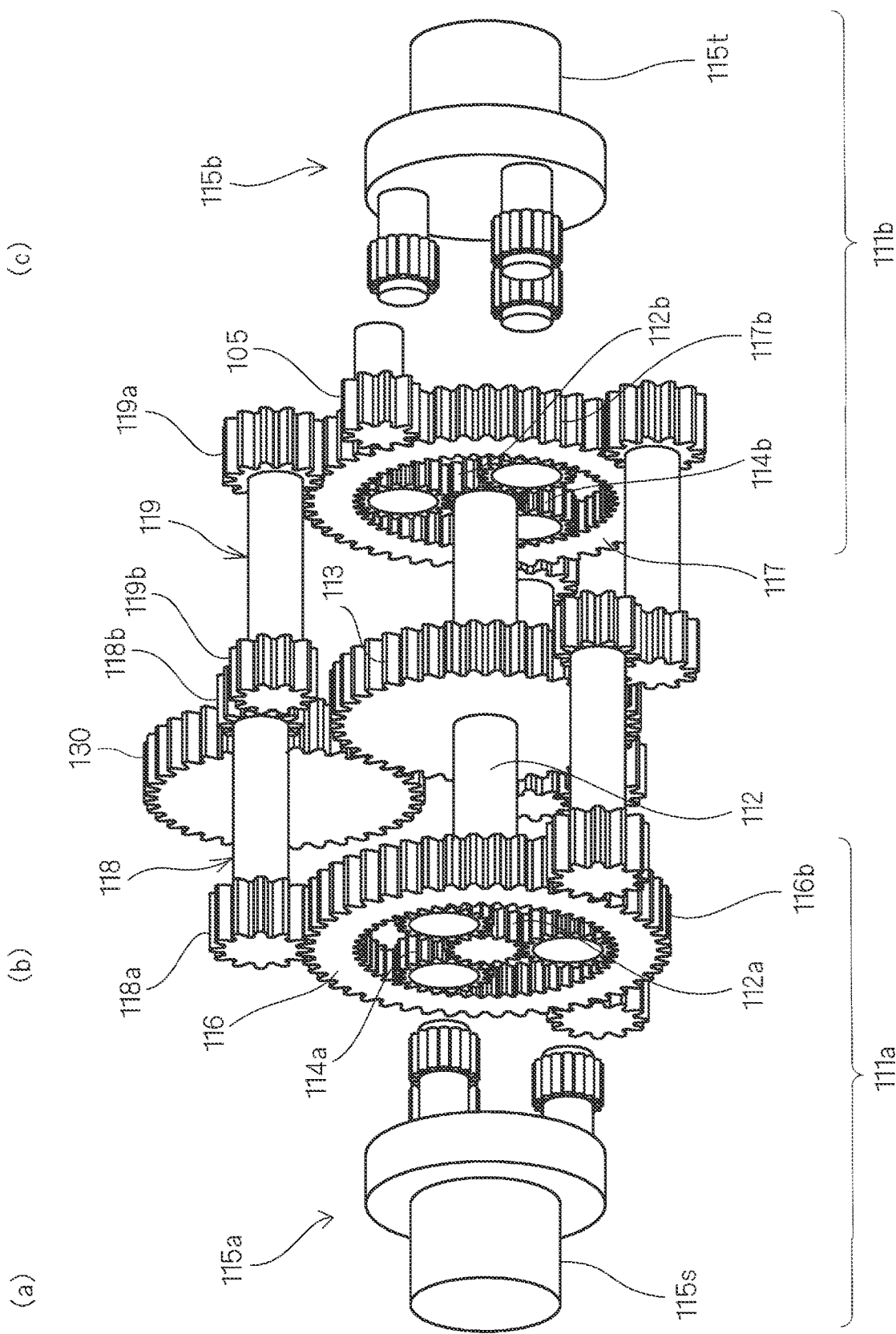
FIG. 16 (a), 16 (b) and 16 (c) are explanatory diagrams of the drive device (Conventional Example 2-2).

In the drive device 110 illustrated in FIG. 15, FIG. 16 (a), 16 (b) and 16 (c), since the central shafts 115s and 115t of the planetary carriers 115a and 115b are the output shafts, gears having a comparatively large module should be used to configure the planetary gear mechanisms 111a and 111b.

As compared with this case, in the drive device 10 according to the specific example, the first and second rotation transmission mechanisms 30 and 31 and the first and second deceleration mechanisms 40 and 41 are provided, the module of the gears of the first and second planetary gear mechanisms 20 and 21 can be reduced, and therefore, although the first and second rotation transmission mechanisms 30 and 31 and the first and second deceleration mechanisms 40 and 41 are additionally provided, the entire mass can be reduced. In other words, since the rotational torque from the drive source is decelerated to be distributed to the right and left wheels before the rotational torque is increased, the entire mass can be reduced in this structure while various functional elements can be additionally provided.

Besides, a deceleration ratio between the first and second output shafts 16 and 17 having the same rotation as the right and left wheels 6 and 7, and the ring gears 26 and 27 of the first and second planetary gear mechanisms 20 and 21 is large. Since a moment of inertia (inertia) is in proportion to a square of a deceleration ratio, a moment of inertia on the side of the drive device 10 against the wheels 6 and 7 is larger than in a case where the first and second output shafts 16 and 17 are respectively coupled to the planetary carriers 28 and 29 of the first and second planetary gear mechanisms 20 and 21, and thus variation in the rotational speed of the wheels 6 and 7 is suppressed. Therefore, vehicle stability can be further improved.

For example, on a cobblestone road (Belgian road) or the like having large surface roughness, road holding performance of tires may be deteriorated, and wheels on one side or both sides may highly rotate to make the vehicle unstable in some cases. Owing to the influence of this inertia, however, the rotation rise of the tires is slowed, and hence the vehicle stability is improved even not under control of the control motor 72. Under control of the control motor 72, the rotation of the right and left wheels can be controlled, and hence, for example, when a current for holding rotation is fed to the control motor 72 to stop the rotation of the ring gears 26 and 27, the right and left wheels are caused to have the same rotation, and a drive force is not lost.

Under control of the control motor 72, the right and left wheels can be controlled by the gear configuration, and as compared with a conventional mechanism using a limited slip diff or the like, less friction is caused and controllability is high.

Figure 8:
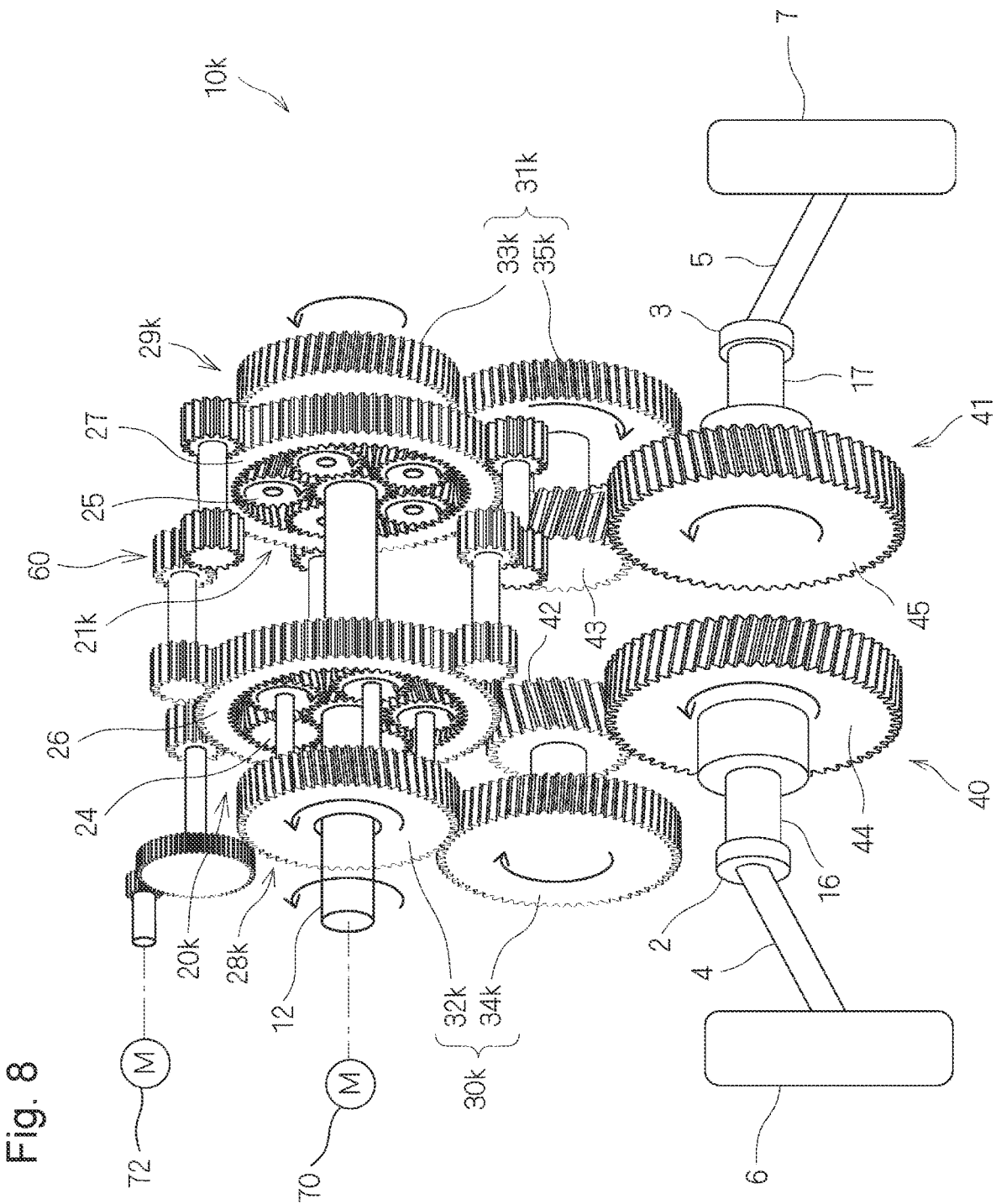
FIG. 8 is an explanatory diagram of a drive device (Modification Example 1).

<Modification Example 1> A drive device 10k of Modification Example 1 in which helical gears are used in first and second rotation transmission mechanisms 30k and 31k will be described with reference to FIG. 8. FIG. 8 is an explanatory diagram of the drive device 10k of Modification Example 1. As illustrated in FIG. 8, the drive device 10k of Modification Example 1 has substantially the same structure as that of Example 1. In the following, like reference signs are used to refer to like components used in Example 1 to mainly describe differences from Example 1.

In a car, helical gears are used in many cases for controlling mechanism noise, and because a contact ratio can be thus increased to increase transmission torque. In the drive device 10 of Example 1, helical gears are used in the planetary gear mechanisms 20 and 21 and the first and second deceleration mechanisms 40 and 41. The first and second deceleration mechanisms 40 and 41 are configured to generate, through the mesh between the helical gears, a thrust force in a direction for causing the first and second output gears 44 and 45 to come close to each other at the time of usual drive, and thus, occurrence of backlash is suppressed.

In the drive device 10 of Example 1, however, the spur gears are used in the first and second rotation transmission mechanisms 30 and 21, and spur gears used as the intermediate gears 34 and 35 of the first and second rotation transmission mechanisms 30 and 31 and the helical gears used as the input-side gears 42 and 43 of the first and second deceleration mechanisms 40 and 41 are fixed to the first and second intermediate shafts 14 and 15. Therefore, a thrust force in the opposite direction to that of the output gears 44 and 45 is applied to the first and second intermediate shafts 14 and 15, and thus, backlash between the first and second intermediate shafts 14 and 15 is increased.

Accordingly, in Modification Example 1, in order to reduce the backlash between the intermediate shafts 14 and 15, helical gears are used as external gears 32k and 33k of the first and second rotation transmission mechanisms 30k and 31k and intermediate gears 34k and 35k as illustrated in FIG. 8. Hands of helix of the two helical gears 34k and 42; or 35k and 43 fixed to each of the intermediate shafts 14 and 15 are in mutually opposite directions as in double helical gears. Out of the two gears 34k and 42; or 35k and 43 fixed to each of the intermediate shafts 14 and 15, however, one gear 34k or 35k has a larger outer diameter than the other gear 42 or 43, and hence, the helix angle of the former gear 34k or 35k is set to be smaller than the helix angle of the latter gear 42 or 43. Thus, thrust forces applied to the intermediate shafts 14 and 15 by the two helical gears 34k and 42; or 35k and 43 are mutually cancelled.

Since the external gears 32k and 33k of the first and second rotation transmission mechanisms 30k and 31k are helical gears, a thrust force in the opposition direction to that of the intermediate gears 34k and 35k, namely, a thrust force in a direction for causing planetary carriers 28k and 29k to move away from each other at the time of usual drive, is applied to the planetary carriers 28k and 29k of first and second planetary gear mechanisms 20k and 21k.

In order to suppress backlash between the planetary carriers 28k and 29k, helical gears of the planetary gear mechanisms 20k and 21k may be configured so that a thrust force in an opposite direction, namely, a thrust force in a direction for causing the planetary gears 24 and 25 to come close to each other at the time of usual drive, can be applied to the planetary carriers 28k and 29k by the planetary gears 24 and 25. When thus configured, a thrust force in the direction for causing the ring gears 26 and 27 to move away from each other is caused, and even if there is a difference between rotational torques distributed to the planetary gear mechanisms 20k and 21k, the thrust force in this direction is always caused, and hence the ring gears 26 and 28 do not move. As a result, the backlash between the ring gears 26 and 27 can be suppressed.

Since a helical gear has a larger load capacity than a spur gear, when helical gears are used in the rotation transmission mechanisms 30k and 31k, sound control and durability can be ensured with the load capacity increased, or with the rotation transmission mechanisms 30k and 31k reduced in size and weight.

<Example 2>A drive device 10m of Example 2 in which the drive motor 70 and the control motor 72 are incorporated together into the drive device 10 of Example 1 will be described with reference to FIGS. 9 (a) and 9 (b).

Figure 9:
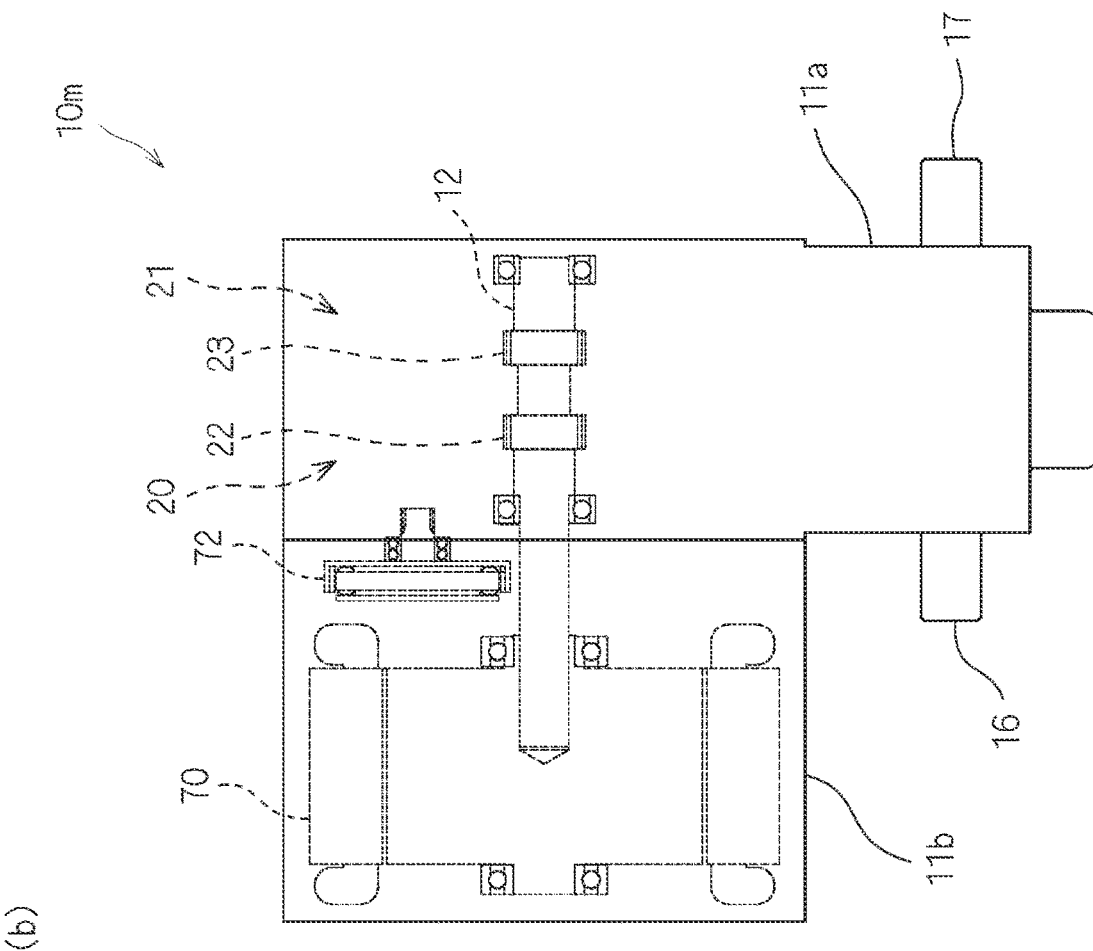
FIGS. 9 (a) and 9 (b) are explanatory diagrams of a drive device (Example 2).
Figure 9:
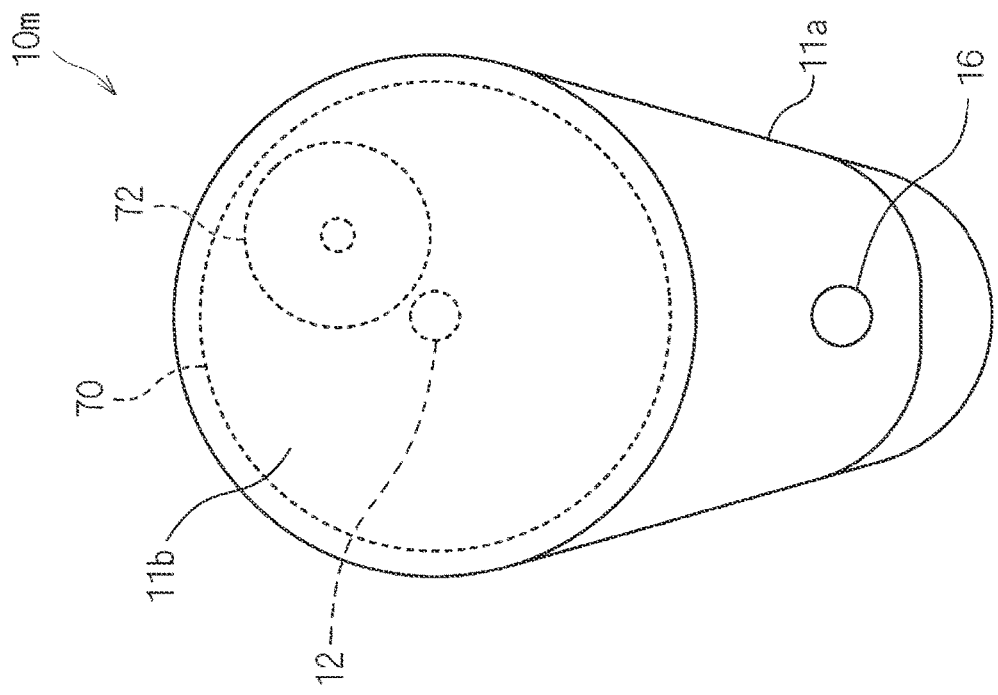

FIG. 9 (a) is a front view of the drive device 10 m. FIG. 9 (b) is a side view of the drive device 10 m. As illustrated in FIGS. 9 (a) and 9 (b), the drive motor 70 for rotatively driving the input shaft 12 and the control motor 72 are disposed on the same side in the axial direction in the drive device 10m, namely, on the opposite side to the first planetary gear mechanism 20 (only the external sun gear 22 illustrated in the drawing) and the second planetary gear mechanism 20 (only the external sun gear 23 illustrated in the drawing), and the motor housing 11b for housing the drive motor 70 and the control motor 72 is disposed on one side in the axial direction of the main housing 11a for housing the drive device 10.

In the drive device 10, deceleration is performed in the planetary gear mechanisms 20 and 21, and deceleration is performed in the rotation transmission mechanisms 30 and 31 and the deceleration mechanisms 40 and 41, and therefore, the rotational speed of the control motor 72 is comparatively high. Besides, the control motor 72 may output only torque for outputting a rotation difference between the right and left wheels, and in addition, the deceleration is performed, and hence its maximum output is, for example, sufficiently ⅕₀ or less of the maximum output of the drive motor 70.

In general, a compact motor cannot avoid having low torque and high rotation, and since the control motor 72 has low torque and high rotation, it can be reduced in size. When a flat motor is used as the control motor 72, the mountability is further improved. There are many types of the flat motor such as an outer rotor motor and a flat coreless motor.

Besides, as the drive motor 70 required of a large output, for example, a double structure motor having an outer rotor and an inner rotor can be used.

In a perspective view in the axial direction as in FIG. 9(*a*), the center of the control motor 72 is disposed inside the drive motor 70, and thus, the motor housing 11*b* does not have a protruding portion derived from the control motor 72. In this case, the drive device 10*m* can be easily mounted on a vehicle.

Although the center of the control motor 72 is disposed inside the drive motor 70 in the perspective view in the axial direction, a part of the control motor 72 may protrude beyond the drive motor 70. In this case, as compared with a case where the center of the control motor 72 is disposed outside the drive motor 70, the protruding portion derived from the control motor 72 is small, and hence the drive device 10*m* can be easily mounted on a vehicle.

Figure 10:
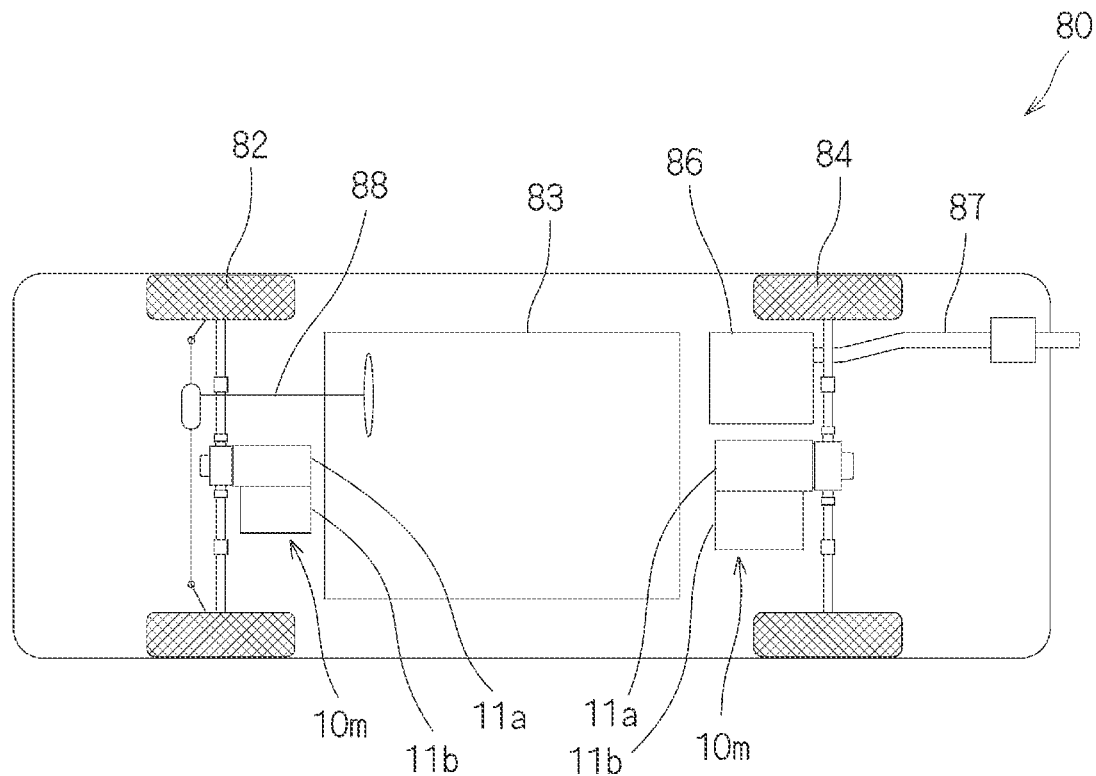
FIG. 10 (a), and 10 (b) are explanatory diagrams of an electric vehicle (Example 3).
Figure 10:
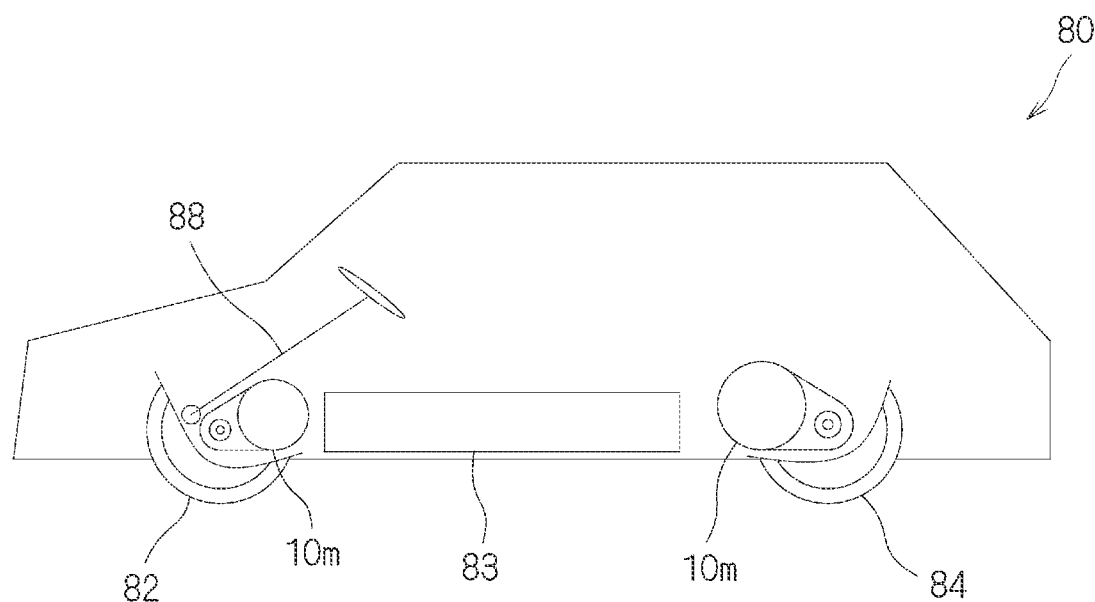

<Example 3> Next, an electric vehicle 80 of Example 3 equipped with the drive device 10*m* of Example 2 will be described with reference to FIG. 10 (*a*) and 10 (*b*). FIG. 10 (*a*) is an explanatory view seen from above the electric vehicle 80. FIG. 10 (*b*) is an explanatory view seen from the side of the electric vehicle 80.

As illustrated in FIG. 10 (*a*) and 10 (*b*), the drive device 10*m* of Example 2 is provided in each of a front wheel portion and a rear wheel portion. Besides, a range extender 86 is disposed in the rear wheel portion. In order to suppress roll change and enable stable driving, a battery 83 that is the heaviest component is disposed at the center of the vehicle in a low floor portion.

If it takes time to charge the battery 83, convenience of the electric vehicle 80 is impaired, and hence, the range extender 86 that is an electric generator is required to be mounted. Many of electric generators use fossil fuel, and hence, it is necessary to provide an exhaust pipe 87. Since the temperature of the exhaust pipe 87 becomes high, it is difficult to dispose the range extender 86 in a vehicle front portion and to extend the exhaust pipe 87 across the battery 83 to a rear portion. Therefore, the range extender 86 is ideally disposed in the rear wheel portion. Heat radiated from the range extender 86 can be used as a heat source for a heater, which is one of the most significant problems of an EV, and a driving distance can be increased when the battery 83 is not used as the heat source.

In a central portion of the vehicle in the driving direction, the main housing 11*a* housing the drive device 10 having a function to distribute a drive force to the right and left wheels is disposed, and on one side of the central portion of the vehicle, the motor housing 11*b* housing the drive motor and the control motor is disposed. Therefore, the range extender 86 can be disposed on the other side (on the right side in the driving direction in the drawing), and thus, the drive device 10*m* and the range extender 86 can be both provided.

In general, as compared with a fossil fuel vehicle such as a gasoline or diesel vehicle, an electric vehicle is increased in weight due to the battery, and a large part of the vehicle weight is loaded on the rear wheels in hill climbing. Accordingly, rear wheel drive is advantageously employed for an electric vehicle. On the other hand, front wheels are advantageously used for energy recovery because load distribution thereto is large in braking. Therefore, it is ideal to dispose the drive device 10*m* in the front wheel portion and the rear wheel portion.

In the front wheel portion, a steering mechanism 88 needs to be disposed on the driver side. Therefore, the drive device 10*m* disposed in the front wheel portion is disposed to have the main housing 11*a* at the central portion of the vehicle in the driving direction and the motor housing 11*b* on the opposite side to the steering mechanism 88. Since the drive device 10*m* includes the motor housing 11*b* only on one side of the main housing 11*a*, well-balanced and ideal arrangement can be easily realized.

As illustrated in FIG. 10 (*a*) and 10 (*b*), from the viewpoint of safety against collision, the battery is disposed in a vehicle central region between the center line of the front wheels 82 and the center line of the rear wheels 84. Besides, when the battery 83 that is the heavy component, and the drive device 10 included in the drive device 10*m*, and the range extender 86 are disposed in the vehicle central region, driving stability against roll in turning and pitch in braking, and safety against collision can be improved.

In the electric vehicle 80, the drive force can be distributed as uniformly as possible to the right and left tires owing to the drive device 10 of the drive device 10*m*, and the driving stability is improved.

<Example 4> A derive device 10*a* of Example 4 that is different from that of Example 1 in arrangement of the external gears 32 and 33 of planetary carriers 28*a* and 29*a*, and in arrangement of the first and second rotation transmission mechanisms 30 and 31 and the first and second deceleration mechanisms 40 and 41 will now be described with reference to FIG. 11.

Figure 11:
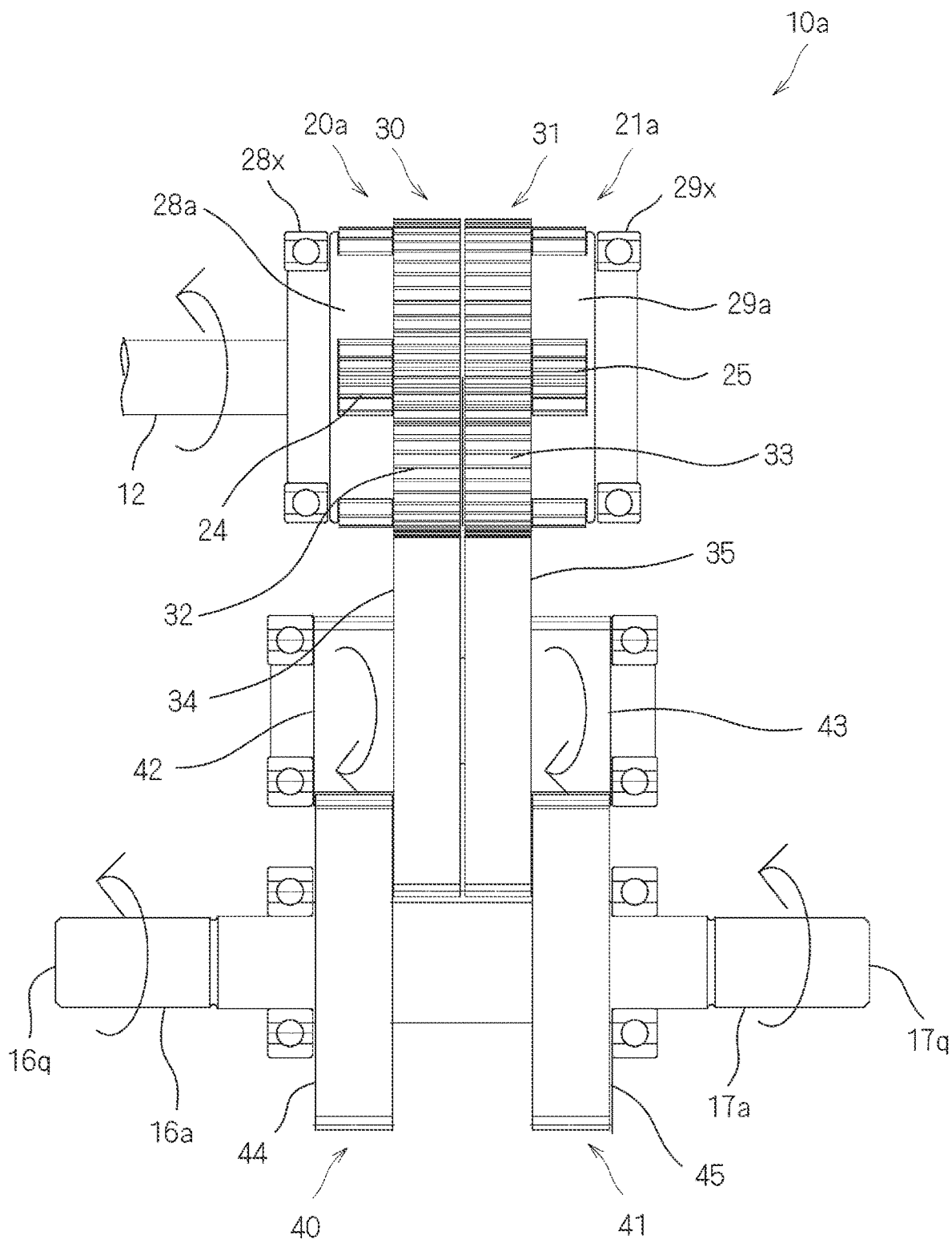
FIG. 11 is an explanatory diagram of a drive device (Example 4).

FIG. 11 is an explanatory diagram of the structure of the drive device 10*a*. As illustrated in FIG. 11, the drive device 10*a* has substantially the same structure as the drive device 10 of Example 1. In the following description, like reference signs are used to refer to like components used in Example 1 to mainly describe differences from Example 1.

In the drive device 10*a*, external sun gears not shown of first and second planetary gear mechanisms 20*a* and 21*a* are fixed to the input shaft 12 in the same manner as in Example 1. The planetary carriers 28*a* and 29*a* rotatably supporting the planetary gears 24 and 25 respectively include the external gears 32 and 33. First end sides of the planetary carriers 28*a* and 29*a* are relatively rotatably coupled to each other through a bearing not shown, and second end sides thereof are rotatably supported by bearings 28*x* and 29*x*. It is noted that ring gears meshing with the planetary gears 24 and 25 and a differential mechanism are not shown in FIG. 11.

Differently from Example 1, the external gears 32 and 33 are disposed inside the planetary carriers 28*a* and 29*a* to be adjacent to each other. In other words, in Example 1, the planetary carrier 28 of the first planetary gear mechanism 20 has the external gear 32 formed on the opposite side to the second planetary gear mechanism 21, and the planetary carrier 29 of the second planetary gear mechanism 21 has the external gear 33 formed on the opposite side to the first planetary gear mechanism 20. On the contrary, in Example 4, the planetary carrier 28*a* of the first planetary gear mechanism 20*a* has the external gear 32 formed on the side of the second planetary gear mechanism 21*a*, and the planetary carrier 29*a* of the second planetary gear mechanism 21*a* has the external gear 32 formed on the side of the first planetary gear mechanism 20*a*.

Besides, with respect to the arrangement in the axial direction, the first and second deceleration mechanisms 40 and 41 are disposed between the first and second rotation transmission mechanisms 30 and 31 in Example 1, but the first and second rotation transmission mechanisms 30 and 31 are disposed between the first and second deceleration mechanisms 40 and 41 in Example 4. In other words, in Example 4, the first and second deceleration mechanisms 40 and 41 are disposed outside, in the axial direction, the first and second rotation transmission mechanisms 30 and 31 with which the external gears 32 and 33 of the planetary carriers 28a and 29a and the intermediate gear 34 and 35 respectively mesh.

Therefore, a distance between the first and second deceleration mechanisms 40 and 41 is larger than in Example 1. First and second output shafts 16a and 17a may be rotatably coupled to each other on first end sides thereof through a bearing not shown in the same manner as in Example 1, or the output gears 44 and 45 may be not coupled to each other but be rotatably supported on both end sides in the axial direction by different bearings.

In the drive device 10a, in the same manner as in the drive device 10 of Example 1, the rotation of the planetary carriers 28a and 29a of the first and second planetary gear mechanisms 20a and 21a is decelerated to be transmitted to the first and second output shafts 16a and 17a, and hence, the first and second planetary gear mechanisms 20a and 21a can be reduced in size. As a result, as compared with a case where the first and second rotation transmission mechanisms 30 and 31 and the first and second deceleration mechanisms 40 and 41 are not provided, the drive device 10a can be reduced in size. Besides, as compared with the case the first and second rotation transmission mechanisms 30 and 31 and the first and second deceleration mechanisms 40 and 41 are not provided, a dimension between tip ends 16q and 17q of the output shafts 16a and 17a protruding in the mutually opposite directions can be reduced, and the drive shaft can be increased in length, and hence a vehicle suspension system that makes vehicle driving more stable can be configured.

Figure 12:
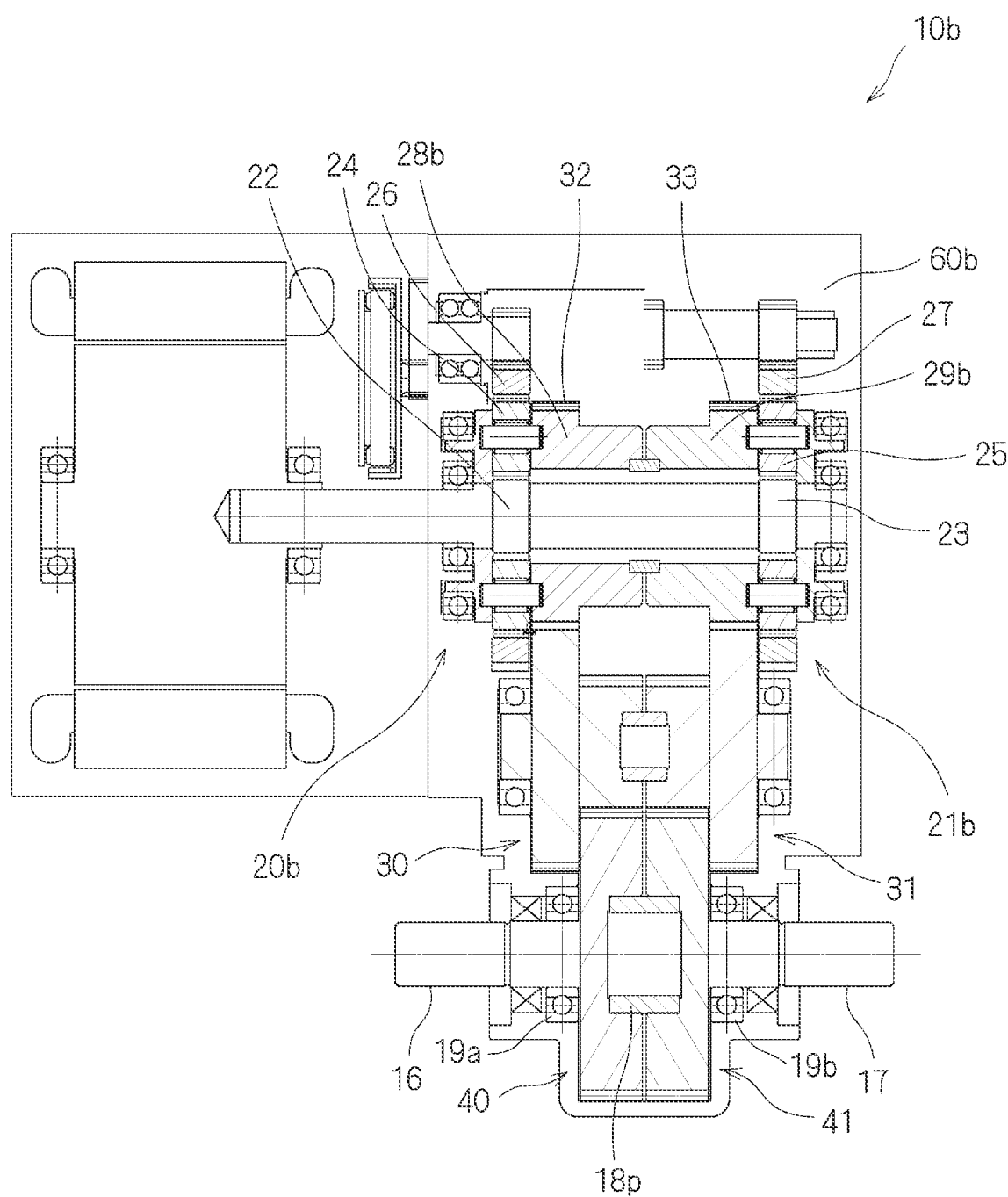
FIG. 12 is an explanatory diagram of a drive device (Example 5).
Figure 13:
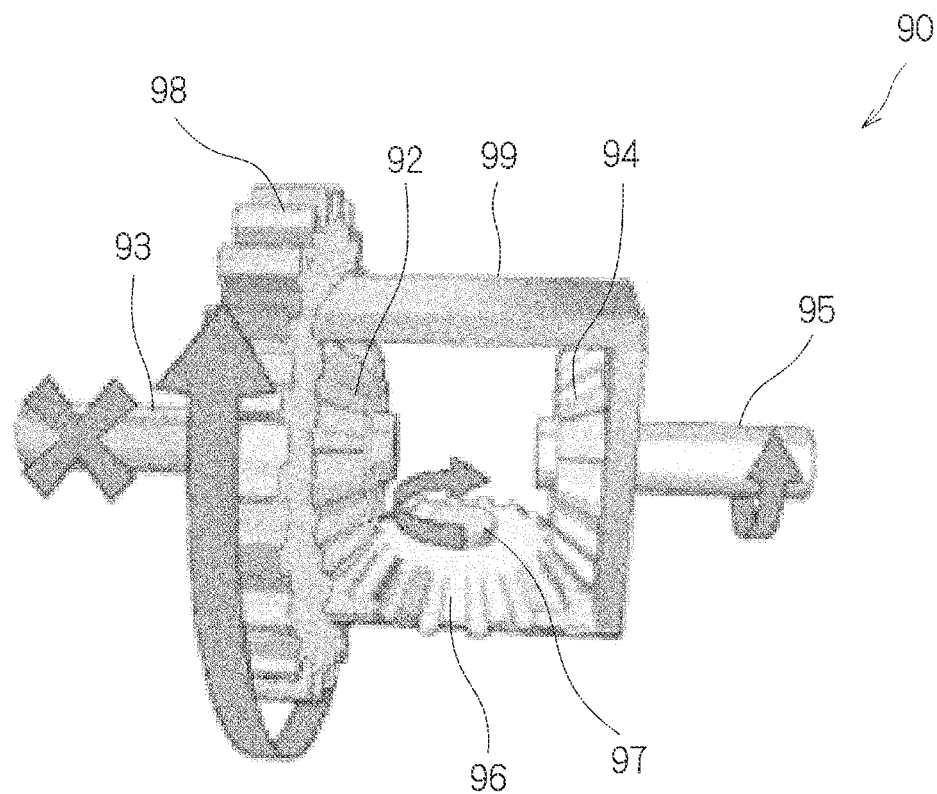
FIG. 13 (a) and 13 (b) are explanatory diagrams of a diff mechanism (Conventional Example 1).
Figure 13:
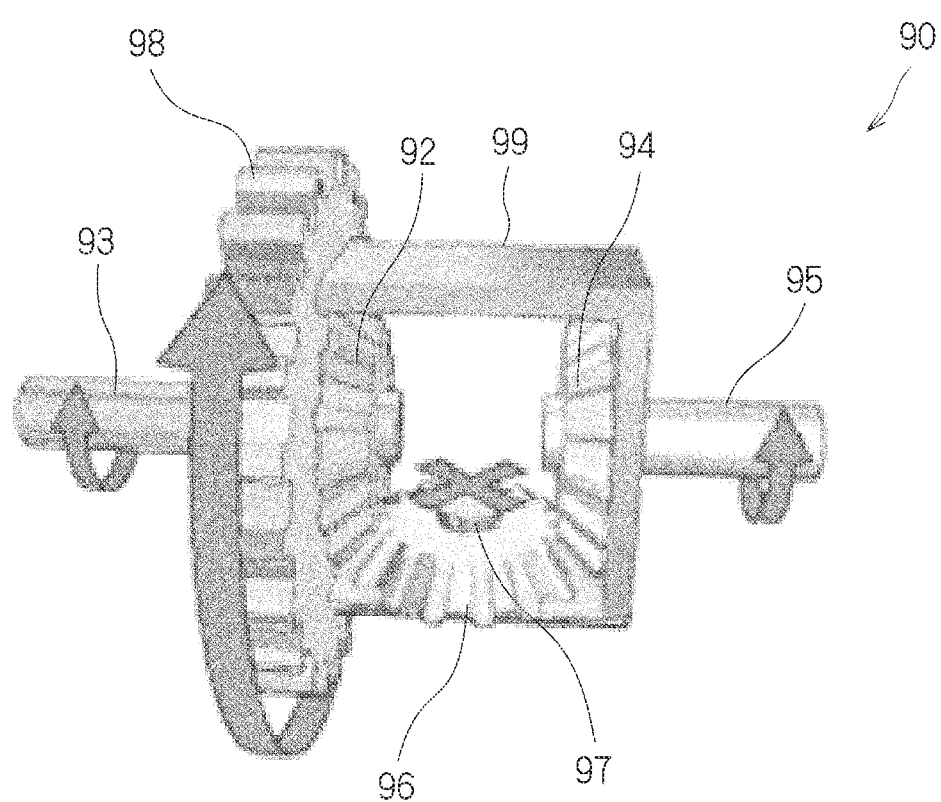
Figure 14:
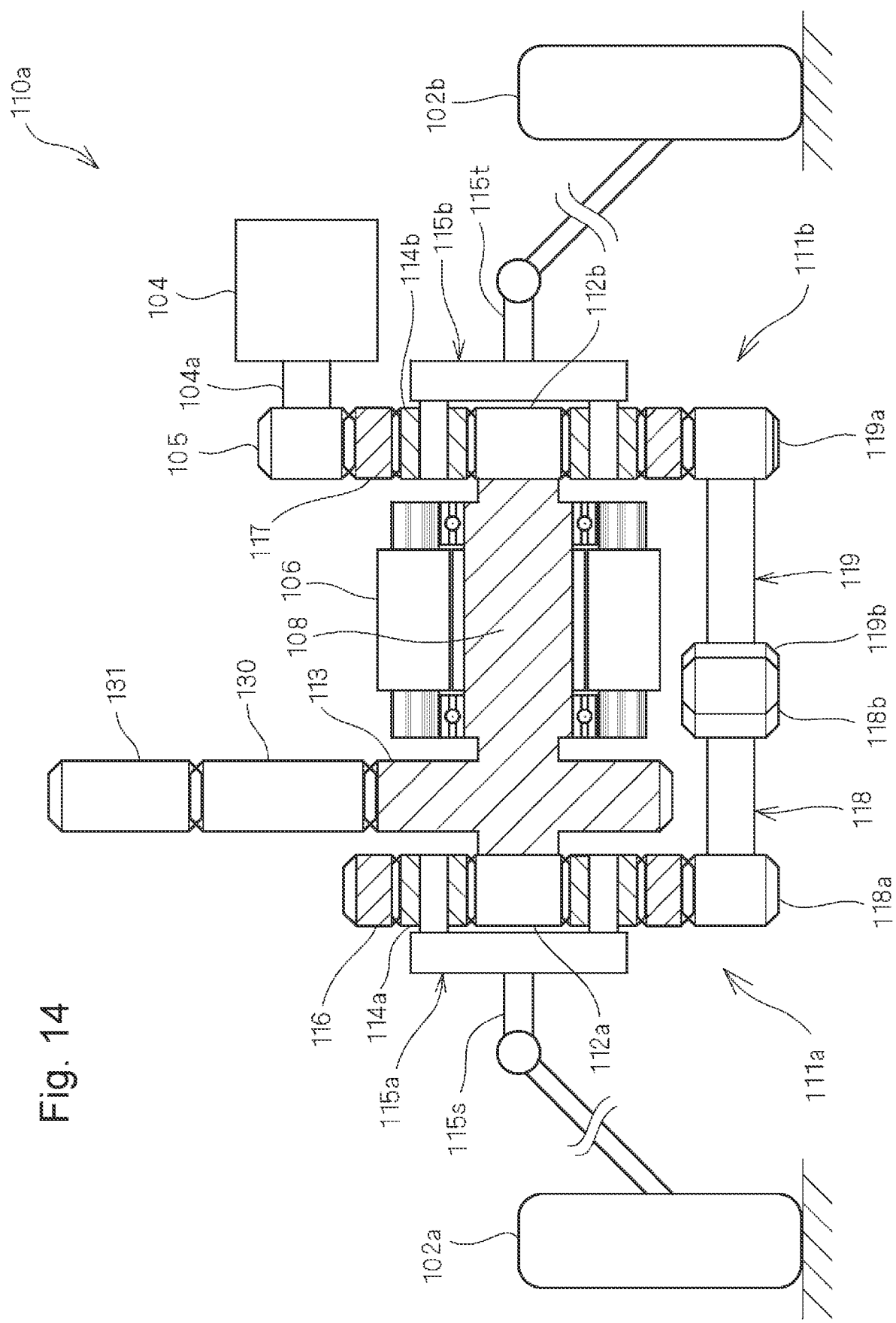
FIG. 14 is an explanatory diagram of a drive device (Conventional Example 2-1).

<Example 5> A drive device 10b of Example 5 different from that of Example 1 in arrangement of the external gears 32 and 33 of planetary carriers 28b and 29b will now be described with reference to FIG. 12. FIG. 12 is an explanatory diagram illustrating the structure of the drive device 10b.

As illustrated in FIG. 12, the drive device 10b has substantially the same structure as that of Example 1. The first and second rotation transmission mechanisms 30 and 31, the first and second deceleration mechanisms 40 and 41, and the first and second output shafts 16 and 17 are the same in their structures as those of Example 1, and the same in their arrangement as in Example 1.

On the other hand, the first and second planetary gear mechanisms 20b and 21b have a different structure from that of Example 1. Specifically, in Example 1, the planetary carrier 28 of the first planetary gear mechanism 20 has the external gear 32 on a side farther from the second planetary gear mechanism 21 than the external sun gear 22, the planetary gear 24 and the ring gear 26 of the first planetary gear mechanism 20, and the planetary carrier 29 of the second planetary gear mechanism 21 has the external gear 33 on a side farther from the first planetary gear mechanism 20 than the external sun gear 23, the planetary gear 25 and the ring gear 27 of the second planetary gear mechanism 21. On the other hand, in Example 5, the planetary carrier 28b of the first planetary gear mechanism 20b has the external gear 32 on a side closer to the second planetary gear mechanism 21b than the external sun gear 22, the planetary gear 24 and the ring gear 26 of the first planetary gear mechanism 20b, and the planetary carrier 29b of the second planetary gear mechanism 21b has the external gear 33 on a side closer to the first planetary gear mechanism 20 than the external sun gear 23, the planetary gear 25 and the ring gear 27 of the second planetary gear mechanism 21b.

Therefore, distances respectively between the external sun gear 22, the planetary gear 24 and the ring gear 26 of the first planetary gear mechanism 20b, and the external sun gear 23, the planetary gear 25 and the ring gear 27 of the second planetary gear mechanism 21b are larger than in Example 1, and it is necessary to increase, as compared with those in Example 1, dimensions in the axial direction of the planetary carriers 28b and 29b rotatably coupling the first and second planetary gear mechanisms 20b and 21b to each other, and first and second differential gear members of a differential mechanism 60b connecting the ring gears 26 and 27 of the first and second planetary gear mechanisms 20b and 21b to each other.

In the drive device 10b of Example 5, however, the external sun gears 22 and 23, the planetary gears 24 and 25 and the ring gears 26 and 27 of the first and second planetary gear mechanisms 20b and 21b can be reduced in size and weight as in Example 1, and hence, the drive device 10b can be reduced in size and weight although not as much as in Example 1, and the durability is excellent as in Example 1.

In the drive device 10b of Example 5, the output shafts 16 and 17 are relatively rotatably coupled and integrated to each other through the bearing 18p. The thus integrated output shafts 16 and 17 are rotatably supported by the bearings 19a and 19b disposed on both end sides in the axial direction of the output gear members 44 and 45, and thus are in both-end supported state.

Figure 17:
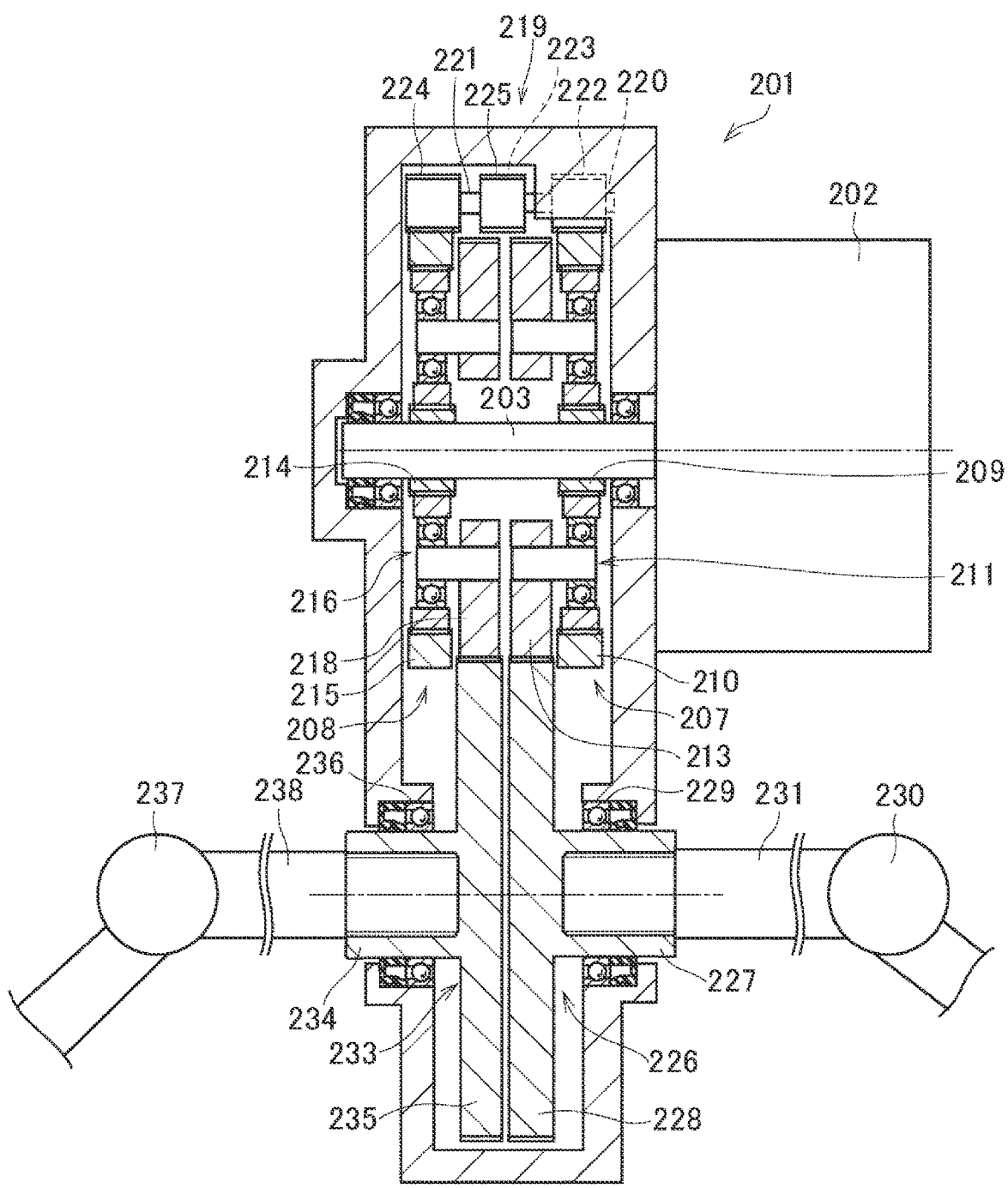
FIG. 17 is an explanatory diagram of a drive device (Conventional Example 3).

On the other hand, in Conventional Example 3 illustrated in FIG. 17, the output gear members 226 and 233 are independent of each other, are supported on first end sides thereof alone by the bearings 229 and 236, and thus are in a cantilever state.

Support stiffness is higher in a both-end supported state than in a cantilever state. Therefore, the drive device 10b of Example 5 has a lower risk of damage of gears and bearings and is excellent in durability as compared with that of Conventional Example 3.

Conventional Example 3 illustrated in FIG. 17 includes one stage gear mesh between the externally toothed gears 213 and 218 of the planetary carriers 211 and 216, and the output gears 228 and 235 of the output gear members 226 and 233. Change of this mesh to two stage gear mesh cannot be easily arrived at.

In general, when one stage gear mesh is changed to two stage gear mesh, not only the number of gears is increased, but also it is necessary to provide a common shaft for coupling the first stage and the second stage to each other, a bearing for supporting the shaft and the like, and thus, the number of components increases, the structure becomes complicated, and production cost is increased. Accordingly, unless there is some purpose, one stage gear mesh is not changed to two stage gear mesh.

In Conventional Example 3, as illustrated in FIG. 17, the gear mesh between the externally toothed gears 213 and 218 of the planetary carriers 211 and 216 and the output gears 228 and 235 of the output gear members 226 and 233 is provided for disposing the planetary gear mechanisms 207 and 208 to be away from the input shafts 231 and 238 of the connection mechanisms 230 and 231 in the direction perpendicular to the axial direction, and this gear mesh does not aim to reduce the size of the planetary gear mechanisms 207 and 208. It is a novel idea revealed by the present specification for the first time that a planetary gear mechanism is reduced in size by additionally providing deceleration through gear mesh, and it is neither reasonable nor necessary to change the one stage gear mesh of Conventional Example 3 to two stage gear mesh.

Besides, the positive effect that the planetary gear mechanisms 20 and 21 are reduced in size and weight by additionally providing deceleration through gear mesh surpasses the negative effect that the mass and dimension are increased due to the addition of the deceleration through gear mesh, and as a result, the entire derive device 10b can be reduced in size and weight, which is an unpredictable remarkable effect.

Accordingly, the drive device 10b of Example 3 has a creative structure that cannot be arrived at even by those skilled in the art.

<Conclusion> As described so far, owing to the first and second rotation transmission mechanisms and the first and second deceleration mechanisms, a selectable range of the deceleration ratio between the planetary carriers of the first and second planetary gear mechanisms and the first and second output shafts is increased, and therefore, the two planetary gear mechanisms can be sufficiently reduced in size, and the entire drive device can be reduced in size and weight. Besides, the mutually opposing base ends of the two output shafts for outputting rotational torque can be disposed to be close to each other, and thus, the dimension between the tip ends of the two output shaft protruding in the mutually opposite directions can be reduced. Besides, a moment of inertia on the side of the drive device against a wheel is increased to suppress variation of the rotational speed of the wheel, and furthermore, the entire width of the drive device can be reduced, and therefore the degree of freedom in design of a suspension system is increased under restriction of a vehicle tread, so that vehicle stability can be further improved. In addition, the output shafts, the planetary carriers, or ring gears are mutually coupled to be relatively rotatable through a bearing, and hence the support stiffness is improved as compared with that in a cantilever state, and therefore, there is a low risk of damage of bearings and gears, and excellent durability is obtained.

Specifically, since rotational torque is distributed by the two planetary gear mechanisms to be output from the first and second output shafts through the first and second rotation transmission mechanisms and the first and second deceleration mechanisms, a compact and light vehicular drive device having a diff mechanism can be provided. Since the control motor is provided, what is called a torque vectoring mechanism capable of drive force distribution can be realized to contribute to vehicle electrification. Besides, it is possible to provide an electric unit, with which in driving on bad roads having "matagi" or surface roughness, in high speed driving or the like, vehicle stability is increased by controlling a drive force of the vehicle, and in addition, in low speed driving, a minimum turning radius or the like is reduced to increase convenience of the vehicle, and which is suitable for vehicle control meeting recent social needs such as self-driving and collision avoidance.

It is noted that the present invention is not limited to the above-described embodiment but can be practiced with various modifications.

For example, the drive motor may be disposed on one side in the axial direction in the drive device with the control motor disposed on the other side. The gears of the first and second rotation transmission mechanisms, the first and second deceleration mechanisms, and the differential mechanism may be gears other than spur gears and helical gears, such as bevel gears and face gears.

REFERENCE SIGNS LIST 10, 10a, 10b, 10k, 10m drive device
10x imaginary plane
11a main housing
11b motor housing
12 input shaft
14 first intermediate shaft
15 second intermediate shaft
16, 16a first output shaft
17, 17a second output shaft
18p bearing (first bearing)
18r bearing (second bearing)
18s bearing (third bearing)
20, 20a, 20b, 20k first planetary gear mechanism
21, 21a, 21b, 21k second planetary gear mechanism
22, 23 external sun gear
24, 25 planetary gear
26, 26b, 27, 27b ring gear
28, 28a, 28k, 29, 29a, 29k planetary carrier
30, 30k first rotation transmission mechanism
31, 31k second rotation transmission mechanism
32, 33 external gear
34, 34k, 35, 35k intermediate gear
40 first deceleration mechanism
41 second deceleration mechanism
42, 43 input-side gear
44, 45 output gear
56 control gear member (rotation control mechanism)
60, 60b differential mechanism
68, 69 rotation member
68k, 69k brake device
70 drive motor
72 control motor
74, 75 brake mechanism
80 electric vehicle
82 front wheel
84 rear wheel
86 range extender

The invention claimed is:

1. A drive device for distributing rotational torque to right and left wheels of a vehicle, comprising:
an input shaft rotatively driven by a drive source;
first and second intermediate shafts rotatably supported;
first and second output shafts rotatably supported;
first and second planetary gear mechanisms coupled to the input shaft in such a manner as to be adjacent to each other in an axial direction of the input shaft;
a differential mechanism for equally distributing the rotational torque to the first and second planetary gear mechanisms;
a first rotation transmission mechanism that transmits rotation from the first planetary gear mechanism to the first intermediate shaft;
a second rotation transmission mechanism that transmits rotation from the second planetary gear mechanism to the second intermediate shaft;
a first deceleration mechanism that transmits rotation from the first intermediate shaft to the first output shaft with the rotation decelerated; and
a second deceleration mechanism that transmits rotation from the second intermediate shaft to the second output shaft with the rotation decelerated,
wherein each of the first and second planetary gear mechanisms includes:
an external sun gear fixed to the input shaft;
a plurality of planetary gears that mesh with the external sun gear, and rotate around the external sun gear while revolving;

a hollow cylindrical ring gear that is rotatably supported, and includes inner teeth meshing with the planetary gears; and a planetary carrier that rotatably supports the planetary gears, the planetary carrier includes an external gear corresponding to an externally toothed gear that is coaxial with the input shaft, is adjacent to the planetary gears in the axial direction, and rotates together with the planetary carrier, the differential mechanism connects the ring gear of the first planetary gear mechanism to the ring gear of the second planetary gear mechanism in such a manner that the ring gears rotate in mutually opposite directions, the first rotation transmission mechanism includes:

the external gear of the planetary carrier of the first planetary gear mechanism; and a first intermediate gear that is fixed to the first intermediate shaft and meshes with the external gear of the planetary carrier of the first planetary gear mechanism, the second rotation transmission mechanism includes:

the external gear of the planetary carrier of the second planetary gear mechanism; and a second intermediate gear that is fixed to the second intermediate shaft, and meshes with the external gear of the planetary carrier of the second planetary gear mechanism, and the rotational torque input to the input shaft is distributed to the first planetary gear mechanism and the second planetary gear mechanism, is output from the first output shaft through the first planetary gear mechanism, the first rotation transmission mechanism and the first deceleration mechanism, and is output from the second output shaft through the second planetary gear mechanism, the second rotation transmission mechanism, and the second deceleration mechanism.

2. The drive device according to claim 1, further comprising, in one of or both of the ring gears of the first and second planetary gear mechanisms, a rotation control mechanism that transmits rotational torque from a control motor.

3. The drive device according to claim 1, wherein the first and second output shafts are disposed coaxially with each other, and are relatively rotatably coupled to each other through a first bearing on first end sides thereof opposing each other.

4. The drive device according to claim 3, wherein the first and second deceleration mechanism respectively include first and second output gears respectively fixed to the first and second output shafts, and the first and second output gears respectively include helical gears having helix angles mutually in opposite directions in such a manner as to cause the first and second output shafts to come close to each other in usual drive.

5. The drive device according to claim 1, wherein the first and second rotation transmission mechanisms are respectively configured to decelerate rotation of the planetary carriers of the first and second planetary gear mechanisms, and transmit decelerated rotation to the first and second intermediate shafts.

6. The drive device according to claim 1, wherein the planetary carriers of the first and second planetary gear mechanisms are adjacent to each other in the axial direction, and are relatively rotatably coupled to each other through a second bearing.

7. The drive device according to claim 1, wherein the planetary carrier of the first planetary gear mechanism has the external gear on a side opposite to the second planetary gear mechanism, and the planetary carrier of the second planetary gear mechanism has the external gear on a side opposite to the first planetary gear mechanism.

8. The drive device according to claim 1, wherein the ring gears of the first and second planetary gear mechanisms are coaxial with each other, are adjacent to each other in the axial direction, and are relatively rotatably coupled to each other through a third bearing.

9. The drive device according to claim 1, further comprising:

a rotation member connected, to rotate, to a rotating member disposed between the input shaft and each of the first and second output gears; and a brake device that stops rotation of the rotation member.

10. The drive device according to claim 2, further comprising:

a drive motor corresponding to the drive source; and the control motor, wherein the drive motor and the control motor are both disposed on an opposite side of the first planetary gear mechanism to the second planetary gear mechanism, or on an opposite side of the second planetary gear mechanism to the first planetary gear mechanism.

11. The drive device according to claim 10, wherein a center of the control motor is disposed inside the drive motor in a perspective view in the axial direction.

* * * * *